US011922551B2

(12) United States Patent
Zhu et al.

(10) Patent No.: US 11,922,551 B2
(45) Date of Patent: Mar. 5, 2024

(54) COMPUTER-IMPLEMENTED METHOD OF REALIZING DYNAMIC EFFECT IN IMAGE, AN APPARATUS FOR REALIZING DYNAMIC EFFECT IN IMAGE, AND COMPUTER-PROGRAM PRODUCT

(71) Applicant: BOE Technology Group Co., Ltd., Beijing (CN)

(72) Inventors: Dan Zhu, Beijing (CN); Hanwen Liu, Beijing (CN); Pablo Navarrete Michelini, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 541 days.

(21) Appl. No.: 17/047,935

(22) PCT Filed: Dec. 19, 2019

(86) PCT No.: PCT/CN2019/126648
§ 371 (c)(1),
(2) Date: Oct. 15, 2020

(87) PCT Pub. No.: WO2021/120111
PCT Pub. Date: Jun. 24, 2021

(65) Prior Publication Data
US 2023/0115094 A1 Apr. 13, 2023

(51) Int. Cl.
G06T 13/40 (2011.01)
G06F 3/0482 (2013.01)
G06F 3/04845 (2022.01)
G06F 3/04883 (2022.01)
G06T 7/194 (2017.01)
G06T 7/70 (2017.01)
G06T 11/60 (2006.01)

(52) U.S. Cl.
CPC ............ G06T 13/40 (2013.01); G06F 3/0482 (2013.01); G06F 3/04845 (2013.01);
(Continued)

(58) Field of Classification Search
CPC .......... G06T 13/40; G06T 7/194; G06T 7/70; G06T 11/60; G06T 11/203; G06F 3/0482; G06F 3/04845; G06F 3/04883
See application file for complete search history.

(56) References Cited

U.S. PATENT DOCUMENTS 6,873,327 B1 * 3/2005 Edwards ................. G06T 11/60
345/473
10,270,983 B1 * 4/2019 Van Os ................... H04N 7/147
(Continued)

FOREIGN PATENT DOCUMENTS

CN 104571887 A 4/2015
CN 105975239 A 9/2016
(Continued)

OTHER PUBLICATIONS

International Search Report & Written Opinion dated Sep. 29, 2020, regarding PCT/CN2019/126648.
(Continued)

Primary Examiner — William A Beutel
(74) Attorney, Agent, or Firm — Intellectual Valley Law, P.C.

(57) ABSTRACT

A computer-implemented method is provided. The computer-implemented method includes rendering a dynamic effect to one or more objects in an image. The method includes setting boundary points surrounding a foreground object to define a boundary area in which a dynamic movement is to be realized; setting a movement line to define a dynamic movement direction along which the dynamic movement is to be realized, wherein setting the movement line includes detecting a continuous touch over different positions on the touch control display panel; setting a stationary area to define an area in which the dynamic movement is prohibited, wherein setting the stationary area includes detecting a first touch area corresponding to the
(Continued)

stationary area on the touch control display panel; and generating an animation of the foreground object in the boundary area moving along the dynamic movement direction, thereby realizing the dynamic effect in the image.

20 Claims, 17 Drawing Sheets

(52) U.S. Cl.
CPC .......... *G06F 3/04883* (2013.01); *G06T 7/194* (2017.01); *G06T 7/70* (2017.01); *G06T 11/60* (2013.01)

(56) References Cited

U.S. PATENT DOCUMENTS

| | | | |
|---|---|---|---|
| 2011/0096202 A1* | 4/2011 | Lee ..................... | G06F 3/0488 348/E5.051 |
| 2012/0254747 A1* | 10/2012 | Bocirnea ............... | G16H 30/40 345/620 |
| 2013/0141439 A1* | 6/2013 | Kryzhanovsky ........ | G06T 13/80 345/473 |
| 2015/0324096 A1* | 11/2015 | Leblanc ........... | H04N 21/41407 715/720 |
| 2018/0032236 A1* | 2/2018 | Plota ...................... | G09G 3/007 |
| 2018/0293775 A1* | 10/2018 | Janas ...................... | G06T 13/80 |
| 2022/0269382 A1* | 8/2022 | Yuasa ................... | G06F 3/0481 |

FOREIGN PATENT DOCUMENTS

| | | |
|---|---|---|
| CN | 106713896 A | 5/2017 |
| CN | 107608729 A | 1/2018 |

OTHER PUBLICATIONS

Enlight Pixaloop—Move Photos on the App Store.
PLOTAVERSE on the App Store.

* cited by examiner

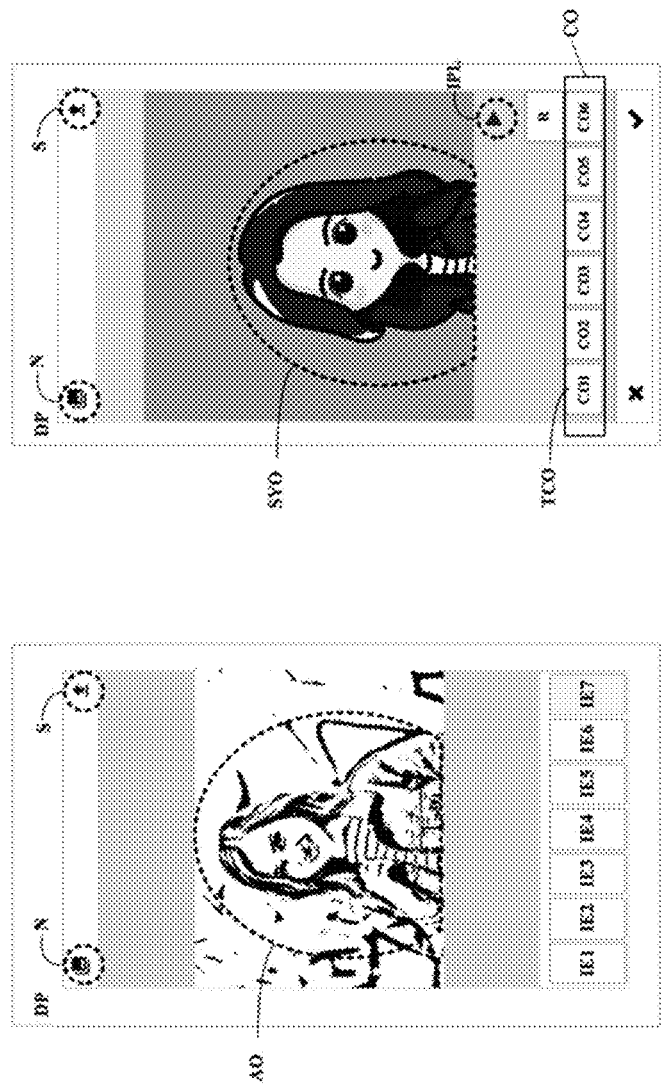

COMPUTER-IMPLEMENTED METHOD OF REALIZING DYNAMIC EFFECT IN IMAGE, AN APPARATUS FOR REALIZING DYNAMIC EFFECT IN IMAGE, AND COMPUTER-PROGRAM PRODUCT

CROSS-REFERENCE TO RELATED APPLICATION

This application is a national stage application under 35 U.S.C. § 371 of International Application No. PCT/CN2019/126648, filed Dec. 19, 2019, the contents of which are incorporated by reference in the entirety.

TECHNICAL FIELD

The present invention relates to display technology, more particularly, to a computer-implemented method of realizing a dynamic effect in an image, an apparatus for realizing a dynamic effect in an image, and a computer-program product.

BACKGROUND

Bring animation to a still image involves various kinds of image processing technologies, such as adding animated elements to the still image, segmenting an object in the still image and adding the segmented object to a pre-existing animation, adding animation movements to an object in the still image.

SUMMARY

In one aspect, the present disclosure provides a computer-implemented method, comprising rendering a dynamic effect to one or more objects in an image; wherein the one or more objects comprise a foreground object; wherein the method comprises setting boundary points surrounding the foreground object to define a boundary area in which a dynamic movement is to be realized, wherein setting the boundary points comprises detecting touch positions corresponding to the boundary points on a touch control display panel in which the image is displayed; setting a movement line to define a dynamic movement direction along which the dynamic movement is to be realized, wherein setting the movement line comprises detecting a continuous touch over different positions on the touch control display panel; setting a stationary area to define an area in which the dynamic movement is prohibited, wherein setting the stationary area comprises detecting a first touch area corresponding to the stationary area on the touch control display panel; and generating an animation of the foreground object in the boundary area moving along the dynamic movement direction, thereby realizing the dynamic effect in the image.

Optionally, the computer-implemented method further comprises removing at least a portion of the stationary area by detecting a second touch area corresponding to the portion of the stationary area on the touch control display panel.

Optionally, the computer-implemented method further comprises removing one of the boundary points or the movement line; wherein removing the one of the boundary points or the movement line comprises detecting a touch on the touch control display panel at a position corresponding to the one of the boundary points or the movement line.

Optionally, one or more objects further comprise a background object; wherein the method further comprises segmenting the background object from the image; selecting a target scene for the background object from a list of candidate scenes; replacing the background object with a target animated background object based on the target scene; and adjusting a hue of the image to be biased toward a hue of the target scene.

Optionally, the computer-implemented method further comprises selecting a target animated mask from a list of candidate animated masks; and overlaying the target animated mask on the image; wherein a hue of the image is adjusted to be biased toward a hue of the target animated mask.

Optionally, the computer-implemented method further comprises selecting a target animated object from a list of candidate animated objects; and superimposing the target animated object on the image.

Optionally, the one or more objects comprise an animal object; wherein the method further comprises selecting a target sub-part object from a list of candidate sub-part objects; automatically detecting a target position and a target orientation of the target sub-part object in the animal object; and automatically replacing the target sub-part object with a target animated sub-part object at the target position and along the target orientation; wherein the target animated sub-part object has an animated movement.

Optionally, the animal object is a body image of a subject; and the target sub-part object of the animal object is selected from a group consisting of an eye object, a mouth object, a nose object, an ear object, a neck object, a hand object, an arm object, a finger object, a leg object, a toe object, a lip object, an eyebrow object, a hair object, a knee object, and any portion thereof.

Optionally, the computer-implemented method further comprises rendering a special dynamic effect on the image as a whole.

Optionally, the special dynamic effect is selected from a group consisting of a zooming-in effect, a zooming-out effect, an oscillation effect, a transition from a distal view to a close-up view, a flipping effect, and a TV snowflake effect.

Optionally, the computer-implemented method further comprises selecting a target cartoon object from a list of candidate cartoon objects; superimposing the target cartoon object on the image to generate a synthetic object having the target cartoon object; using a camera to capture a video stream of a subject in real time; and generating a video of the synthetic object having movement synchronized with a movement of the subject simultaneously.

In another aspect, the present disclosure provides an apparatus for realizing a dynamic effect in an image, comprising a touch control display panel; a memory; one or more processors; wherein the memory and the one or more processors are connected with each other; and the memory stores computer-executable instructions for controlling the one or more processors to render a dynamic effect to one or more objects in the image; wherein the one or more objects comprise a foreground object; wherein the memory stores computer-executable instructions for controlling the one or more processors to set boundary points surrounding the foreground object to define a boundary area in which a dynamic movement is to be realized, wherein the boundary points are defined by touch positions on the touch control display panel in which the image is displayed; set a movement line to define a dynamic movement direction along which the dynamic movement is to be realized, wherein the movement line is defined by a continuous touch over different positions on the touch control display panel; set a stationary area to define an area in which the dynamic movement is prohibited, wherein the stationary area is defined by a first touch area corresponding to the stationary area on the touch control display panel; and generate an animation of the foreground object in the boundary area moving along the dynamic movement direction.

Optionally, the memory further stores computer-executable instructions for controlling the one or more processors to remove at least a portion of the stationary area defined by a second touch area on the touch control display panel; and remove one of the boundary points or the movement line upon detection a touch on the touch control display panel at a position corresponding to the one of the boundary points or the movement line.

Optionally, one or more objects further comprise a background object; wherein the memory further stores computer-executable instructions for controlling the one or more processors to segment the background object from the image; select a target scene for the background object from a list of candidate scenes; replace the background object with a target animated background object based on the target scene; and adjust a hue of the image to be biased toward a hue of the target scene.

Optionally, the memory further stores computer-executable instructions for controlling the one or more processors to select a target animated mask from a list of candidate animated masks; and overlay the target animated mask on the image; wherein a hue of the image is adjusted to be biased toward a hue of the target animated mask.

Optionally, the memory further stores computer-executable instructions for controlling the one or more processors to select a target animated object from a list of candidate animated objects; and superimpose the target animated object on the image.

Optionally, the one or more objects comprise an animal object; wherein the memory further stores computer-executable instructions for controlling the one or more processors to select a target sub-part object from a list of candidate sub-part objects; automatically detect a target position and a target orientation of the target sub-part object in the animal object; and automatically replace the target sub-part object with a target animated sub-part object at the target position and along the target orientation; wherein the target animated sub-part object has an animated movement.

Optionally, the memory further stores computer-executable instructions for controlling the one or more processors to render a special dynamic effect on the image as a whole.

Optionally, the apparatus further comprises a camera configured to capture a video stream of a subject in real time; wherein the memory further stores computer-executable instructions for controlling the one or more processors to select a target cartoon object from a list of candidate cartoon objects; superimpose the target cartoon object on the image to generate a synthetic object having the target cartoon object; and generate a video of the synthetic object having movement synchronized with a movement of the subject in the video stream.

In another aspect, the present disclosure provides a computer-program product comprising a non-transitory tangible computer-readable medium having computer-readable instructions thereon, the computer-readable instructions being executable by a processor to cause the processor to perform rendering a dynamic effect to one or more objects in an image; wherein the one or more objects comprise a foreground object; wherein the computer-readable instructions being executable by a processor to cause the processor to perform setting boundary points surrounding the foreground object to define a boundary area in which a dynamic movement is to be realized, wherein the boundary points are set by touch positions on a touch control display panel in which the image is displayed; setting a movement line to define a dynamic movement direction along which the dynamic movement is to be realized, wherein the movement line is set by a continuous touch over different positions on the touch control display panel; setting a stationary area to define an area in which the dynamic movement is prohibited, wherein the stationary area is set by a first touch area on the touch control display panel; and generating an animation of the foreground object in the boundary area moving along the dynamic movement direction.

BRIEF DESCRIPTION OF THE FIGURES

The following drawings are merely examples for illustrative purposes according to various disclosed embodiments and are not intended to limit the scope of the present invention.

FIG. 33 is a schematic diagram showing a touch control display panel having icons corresponding to a plurality of dynamic effects realized in an image using a computer-implemented method in some embodiments according to the present disclosure.

FIG. 34 is a schematic diagram showing a touch control display panel having icons corresponding to steps of rendering an animated cartoon effect on an image in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method of realizing a dynamic effect in an image, an apparatus for realizing a dynamic effect in an image, and a computer-program product that substantially obviate one or more of the problems due to limitations and disadvantages of the related art. In one aspect, the present disclosure provides a computer-implemented method. In some embodiments, the computer-implemented method includes rendering a dynamic effect to one or more objects in an image. Optionally, the one or more objects include a foreground object. In some embodiments, the method includes setting boundary points surrounding the foreground object to define a boundary area in which a dynamic movement is to be realized. Optionally, setting the boundary points includes detecting touch positions corresponding to the boundary points on a touch control display panel in which the image is displayed. Optionally, the method further includes setting a movement line to define a dynamic movement direction along which the dynamic movement is to be realized. Optionally, setting the movement line includes detecting a continuous touch over different positions on the touch control display panel. Optionally, the method further includes setting a stationary area to define an area in which the dynamic movement is prohibited. Optionally, setting the stationary area includes detecting a first touch area corresponding to the stationary area on the touch control display panel. Optionally, the method further includes generating an animation of the foreground object in the boundary area moving along the dynamic movement direction, thereby realizing a dynamic effect in the image.

Figure 1:
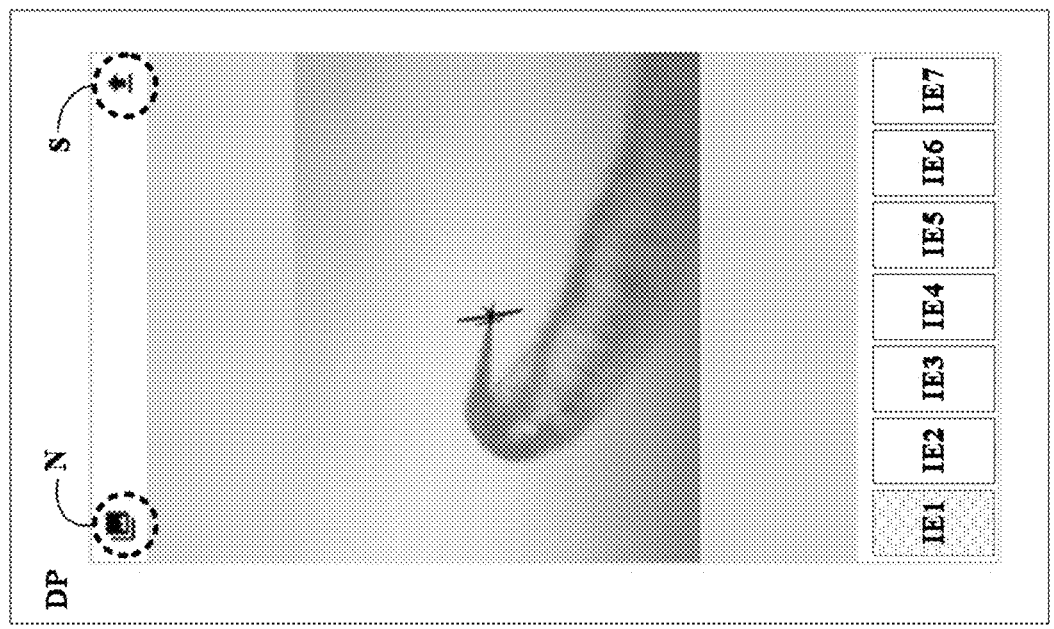
FIG. 1 is a schematic diagram showing a touch control display panel having icons corresponding to a plurality of dynamic effects realized in an image using a computer-implemented method in some embodiments according to the present disclosure.

FIG. 1 is a schematic diagram showing a touch control display panel having icons corresponding to a plurality of dynamic effects realized in an image using a computer-implemented method in some embodiments according to the present disclosure. In some embodiments, a plurality of dynamic effects realized in an image using a computer-implemented method includes a regional dynamic movement effect, an animated background effect, an animated mask effect, an animated object effect, an animated animal effect, an overall dynamic movement effect, and an animated cartoon effect. Referring to FIG. 1, an icon IE1 on the touch control display panel DP corresponds to a regional dynamic movement effect. Optionally, an icon IE2 on the touch control display panel DP corresponds to an animated background effect. Optionally, an icon IE3 on the touch control display panel DP corresponds to an animated mask effect. Optionally, an icon IE4 on the touch control display panel DP corresponds to an animated object effect. Optionally, an icon IE5 on the touch control display panel DP corresponds to an animated animal effect. Optionally, an icon IE6 on the touch control display panel DP corresponds to an overall dynamic movement effect. Optionally, an icon IE7 on the touch control display panel DP corresponds to an animated cartoon effect. Various patterns can be used for an arrangement of positions of icons in the touch control display panel DP.

Optionally, the regional dynamic movement effect is configured to render dynamic effects or animation effects on a portion or a region of an image. For example, dynamic effects or animation effects are rendered on rivers, falls, clouds, textures, lines, or fogs shown in the image, so that an observer can see rivers, falls, clouds, textures, lines, or fogs in the image moving naturally. As used herein, the term "move naturally" refer to a target movement of an object in an image captured by human eyes similar to a movement of a counterpart object in real life captured by human eyes.

Optionally, the animated background effect is configured to render dynamic effects or animated effects on a background of the image, for example, dynamic effects are rendered on a sky background of the image, so that clouds in the sky background can move naturally, or fireworks are displayed in the sky background, or other natural phenomenon can be seen in the sky background such as lightning, raining, and snowing. Optionally, a hue of the image will be adjusted to adapt the dynamic effects or animated effects on the background of the image. For example, when a dynamic effect of displaying fireworks in a night sky background is rendered on an image captured during the daytime, a hue of the image captured during the daytime will be adjusted to a dark hue to adapt to a hue of the night sky.

Optionally, the animated mask effect is configured to add a mask having dynamic effects or animated effects to the image. In one example, the mask covers a portion of the image. In another example, the mask fully covers the whole image. Optionally, the mask having the dynamic effects or animated effects shows a movement of an add-on object. For example, the mask having the dynamic effects or animated effects shows rain falling, snow falling, leaves falling, sun irradiating, bubble floating. Optionally, a hue of the image will be adjusted to adapt a hue of the mask having the dynamic effect. For example, when a mask having a dynamic effect of snow falling is added on an image having a warm hue, the warm hue of the image is adjusted to a cold hue to adapt to a hue of the mask having the dynamic effect of snow falling.

Optionally, the animated object effect is configured to add an object having dynamic effects or animated effects to the image. Optionally, a size of the object having a dynamic effect is adjustable by touches of a user. Optionally, a position of the object locating in the touch control display panel can be adjusted by touches of the user. Optionally, a hue of the image is not changed to a hue corresponding to a hue of the object. Examples of objects having the dynamic effects or animated effects includes, but are not limited to a falling leaf, a flying butterfly, and a burning flame.

Optionally, the animated animal effect is configured to render dynamic effects or animated effects on a portion of an animal object in the image (e.g., a human object). In one example, when a dynamic effect is rendered on a portion of the animal object, the portion of the animal object moves naturally. For example, a human object in an image can blink eyes (e.g., an eye portion of the human moves naturally). In another example, when a dynamic effect is rendered on a portion of the animal object, an object corresponding to the portion of the animal object is added on top of the portion of the animal object, and the object having a dynamic effect mimic a movement of the portion of the animal object. For example, a cartoon beard is added to a beard portion of a human object in the image, and a movement of the cartoon beard mimic a movement of a beard in a human face in real life.

Optionally, the overall dynamic movement effect is configured to allow the whole image to perform a dynamic movement without changing a portion of the image, for example, the dynamic movement is rendered on the image to allow the image to move along a direction from up to bottom, to spin, to shake, or to zoom-in or zoom-out.

Optionally, the animated cartoon effect is configured to allow a cartoon image to have a movement synchronized with a movement of a subject simultaneously. For example, when a cartoon cat facial image is chosen, and a facial expression of the cartoon cat facial image changes simultaneously, when a human facial expression changes in real time.

In some embodiments, the computer-implemented method includes inputting data. Optionally, inputting data includes detecting a touch on an icon N; selecting a data from database or through a camera; and inputting the data. For example, the data is an image.

In some embodiments, the computer-implemented method includes outputting data. Optionally, outputting data includes detecting a touch on an icon S; selecting one or more processed data; and outputting the one or more processed data. For example, the one or more processed data is one or more processed images or videos having dynamic effects or animated effects among the plurality of dynamic effects described herein.

In some embodiments, referring to FIG. 1, the computer-implemented method of realizing the dynamic effect in an image includes rendering a dynamic effect to one or more objects O in the image. For example, the dynamic effect is selected from the plurality of dynamic effects including, but not limited to the regional dynamic movement effect, the animated background effect, the animated mask effect, the animated object effect, the animated animal effect, the overall dynamic movement effect, and the animated cartoon effect.

Optionally, the one or more objects in the image includes a foreground object. As used herein, the term "foreground object" refers to any object that is displayed in an image as if it is atop another object and/or appears as if it may have been printed atop another object. In one example, a foreground object may be a text, a line, a frame, an item, or any other graphical object that is displayed, printed and/or appears atop another object. In another example, a foreground object may be a line surrounded or atop a background color.

Figure 2:
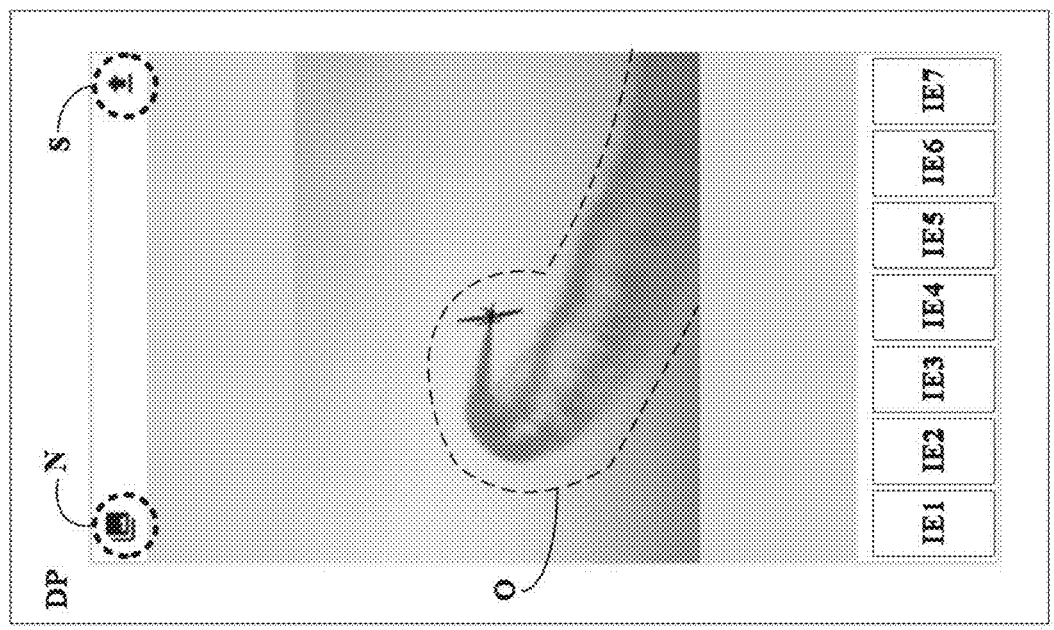
FIG. 2 is a schematic diagram showing a touch control display panel having icons corresponding to a plurality of dynamic effects realized in an image using a computer-implemented method in some embodiments according to the present disclosure.

FIG. 2 is a schematic diagram showing a touch control display panel having icons corresponding to a plurality of dynamic effects realized in an image using a computer-implemented method in some embodiments according to the present disclosure. In some embodiments, referring to FIG. 2, the computer-implemented method includes rendering the regional dynamic movement effect in the image. Optionally, rendering the regional dynamic movement effect in the image includes detecting a touch on the icon IE1 corresponding to the regional dynamic movement effect; and inputting the image by detecting a touch on the icon N.

Figure 3:
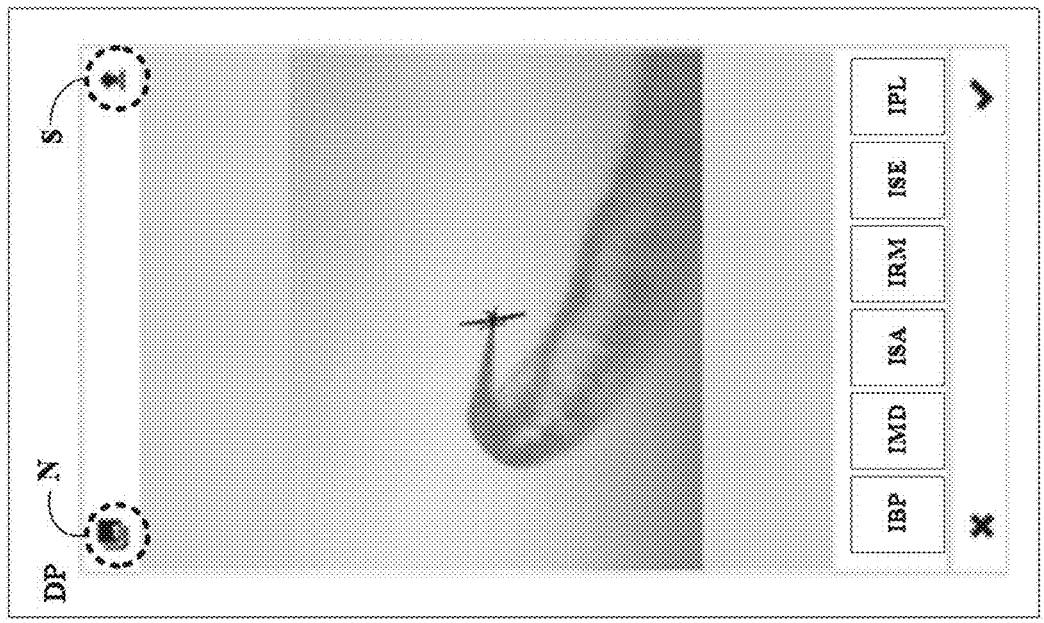
FIG. 3 is a schematic diagram showing a touch control display panel having icons corresponding to steps of rendering a regional dynamic movement effect on an image in some embodiments according to the present disclosure.

FIG. 3 is a schematic diagram showing a touch control display panel having icons corresponding to steps of rendering a regional dynamic movement effect on an image in some embodiments according to the present disclosure. Optionally, referring to FIG. 2 and FIG. 3 subsequent to detecting the touch on the icon IE1, rendering the regional dynamic movement effect in the image includes switching an interface of the touch control display panel DP having icons corresponding to the plurality of dynamic effects to an interface having icons corresponding to one or more steps of rendering the regional dynamic movements effects on the image.

Figure 4:
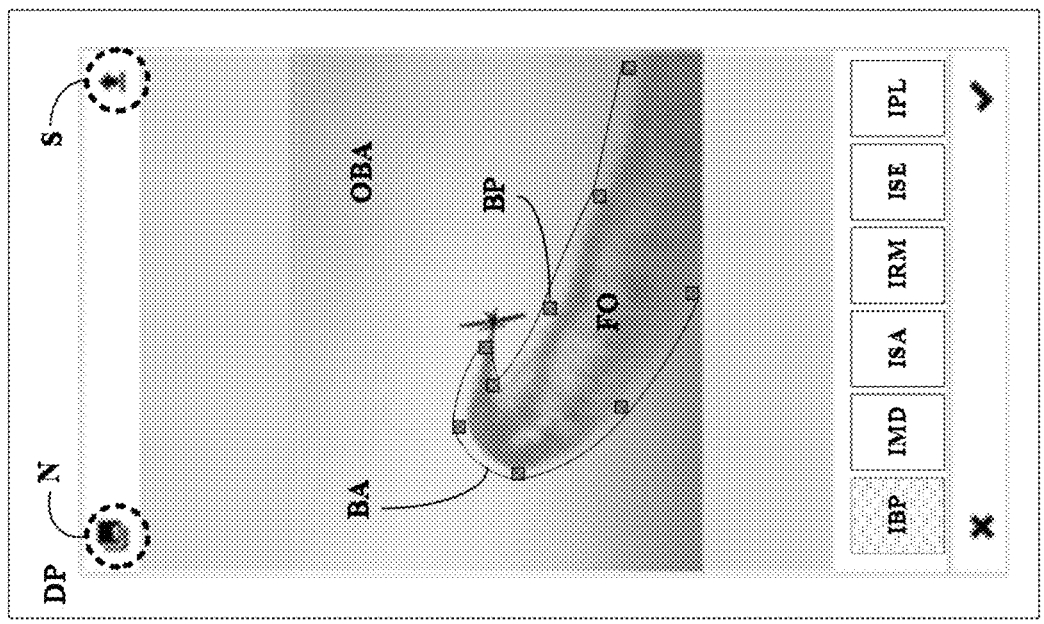
FIG. 4 is a schematic diagram showing a touch control display panel having icons corresponding to steps of rendering a regional dynamic movement effect on an image in some embodiments according to the present disclosure.

FIG. 4 is a schematic diagram showing a touch control display panel having icons corresponding to steps of rendering a regional dynamic movement effect on an image in some embodiments according to the present disclosure. In some embodiments, referring to FIG. 4, the computer-implemented method further includes setting boundary points BP surrounding the foreground object FO to define a boundary area BA in which a dynamic movement is to be realized.

Optionally, setting the boundary points BP includes detecting touch positions corresponding to the boundary points BP on the touch control display panel DP on which the image is displayed. Optionally, prior to detecting touch positions corresponding to the boundary points BP, setting boundary points BP further includes detecting a touch on an icon IBP to trigger a process of setting boundary point BP.

Optionally, the boundary area BA is an area approximately defined by the boundary points BP. For example, the boundary points BP surrounding the foreground object FO approximately define the boundary area BA and an area OBA outside the boundary area BA.

Figure 5:
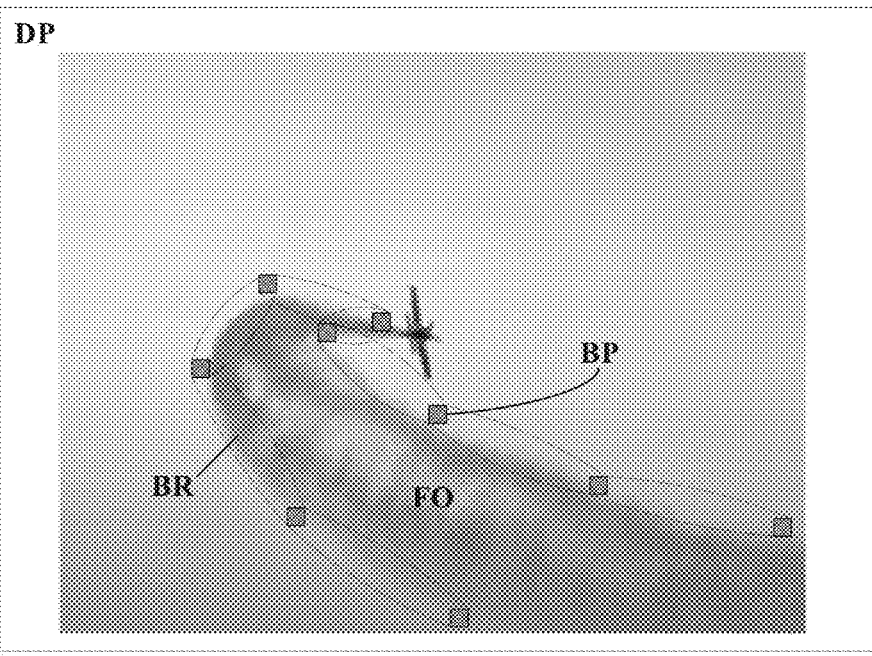
FIG. 5 is a schematic diagram of a plurality of boundary regions in some embodiments according to the present disclosure.
Figure 6:
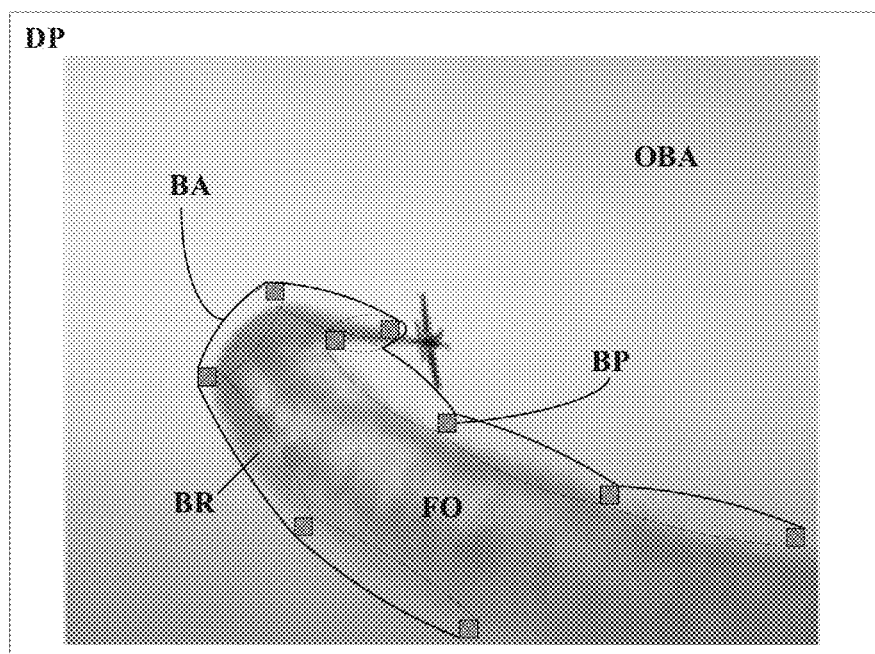
FIG. 6 is a schematic diagram of a boundary area in some embodiments according to the present disclosure.

FIG. 5 is a schematic diagram of a plurality of boundary regions in some embodiments according to the present disclosure. FIG. 6 is a schematic diagram of a boundary area in some embodiments according to the present disclosure. In one example, referring to FIG. 5 and FIG. 6, two immediately adjacent boundary points BP form a boundary region BR. A boundary of the boundary area BA includes multiple boundary regions BR respectively formed by respective pairs of immediately adjacent boundary points BP. The closer a position in the boundary region BR is to a respective boundary point, the less a movement of the animation of the foreground object FO is rendered. The further away a position in the boundary region BR is from a center of the boundary area BA, the less a movement of the animation of the foreground object FO is rendered.

In another example, the boundary of the boundary area BA is not composed of straight connecting lines respectively connecting immediately adjacent boundary points BP.

Figure 7:
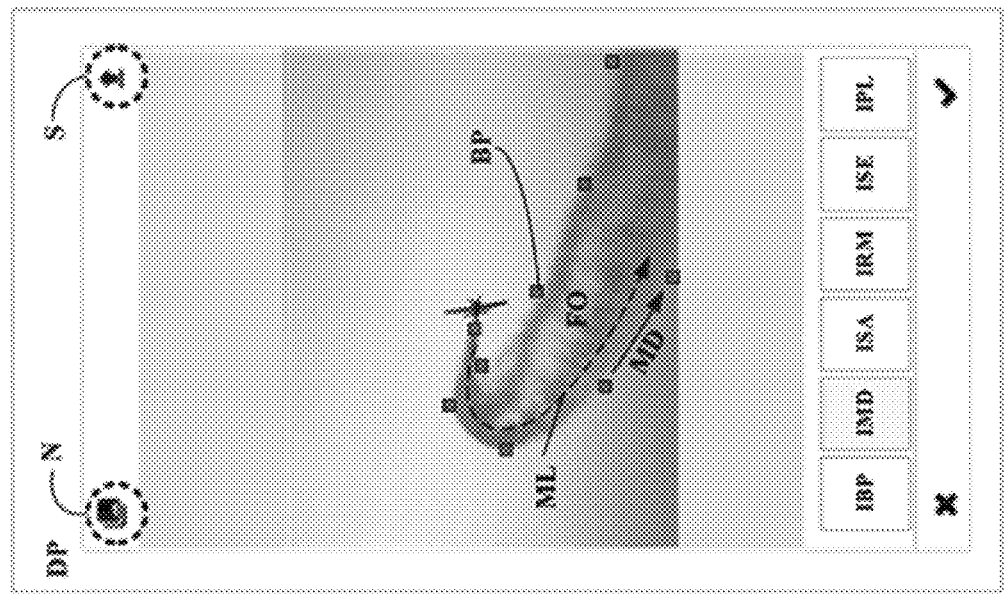
FIG. 7 is a schematic diagram showing a touch control display panel having icons corresponding to steps of rendering a regional dynamic movement effect on an image in some embodiments according to the present disclosure.

FIG. 7 is a schematic diagram showing a touch control display panel having icons corresponding to steps of rendering a regional dynamic movement effect on an image in some embodiments according to the present disclosure. In some embodiments, referring to FIG. 7, the computer-implemented method further includes setting a movement line ML to define a dynamic movement direction MD along which the dynamic movement is to be realized. Optionally, setting the movement line ML includes detecting a touch on an icon IMD to trigger a process of setting the movement line ML and defining the dynamic movement direction MD.

Figure 8:
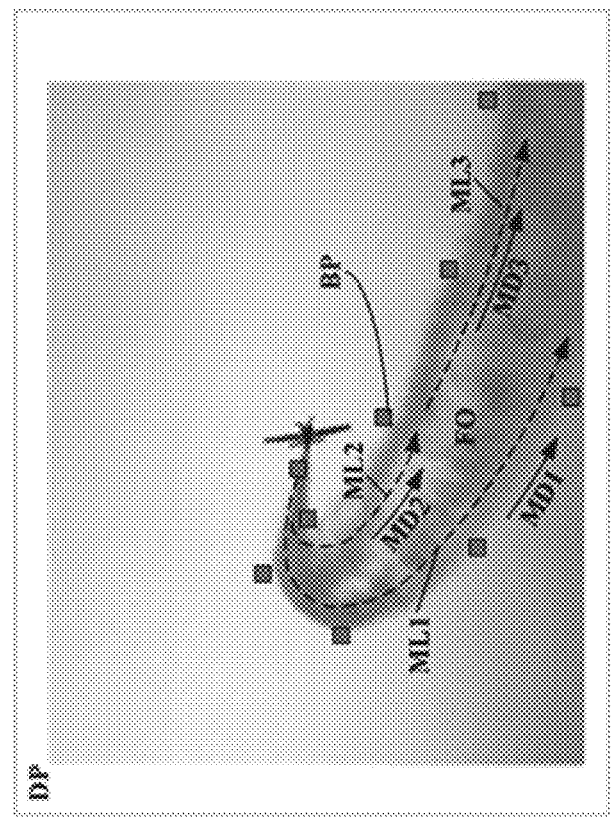
FIG. 8 is a schematic diagram showing dynamic movement directions in an image in some embodiments according to the present disclosure.

FIG. 8 is a schematic diagram showing dynamic movement directions in an image in some embodiments according to the present disclosure. Optionally, referring to FIG. 8, the first movement line ML1 in the image defines a first dynamic movement direction MD1, the second movement line ML2 in the image defines a second dynamic movement direction MD2, and the third movement line ML3 defines a third dynamic movement direction MD3.

Optionally, setting the movement line ML includes detecting a continuous touch over different positions on the touch control display panel DP. For example, detecting a continuous touch includes detecting a first position of the different positions; and detecting a last position of the different positions.

Optionally, setting the movement line ML to define the dynamic movement direction MD further includes connecting different positions of the continuous touch from the first position to the last position to form the movement line ML; defining the dynamic movement direction MD from the first position to the last position and along the movement line ML.

Figure 9:
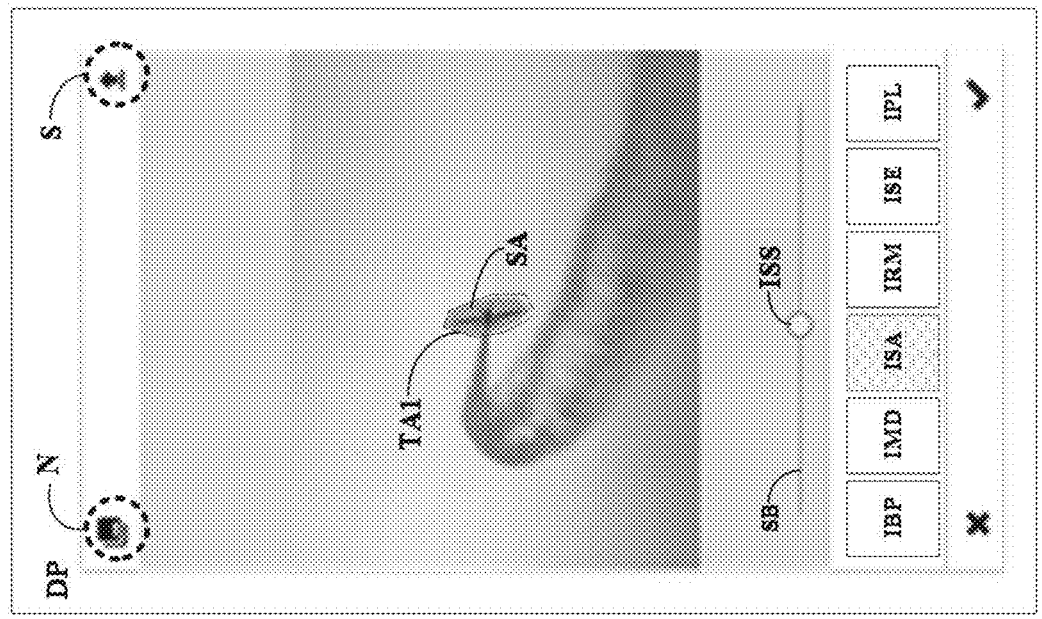
FIG. 9 is a schematic diagram showing a touch control display panel having icons corresponding to steps of rendering a regional dynamic movement effect on an image in some embodiments according to the present disclosure.

FIG. 9 is a schematic diagram showing a touch control display panel having icons corresponding to steps of rendering a regional dynamic movement effect on an image in some embodiments according to the present disclosure. In some embodiments, referring to FIG. 9, the computer-implemented method further includes setting a stationary area SA to define an area in which the dynamic movement DM is prohibited. For example, the boundary area BA partially overlaps with the stationary area SA, the portion of image both in the stationary area SA and boundary area BA will not be affected by the dynamic effect rendered in the boundary area BA. Optionally, prior to setting the stationary area SA, the computer-implemented method further includes detecting a touch on an icon ISA to trigger a process of setting the stationary area SA.

Optionally, setting the stationary area SA includes detecting a first touch area TA1 corresponding to the stationary area SA1 on the touch control display panel DP. In one example, detecting the first touch area TA1 includes detecting a touch on a position. In another example, detecting the first touch area TA1 includes detecting a continuous touch over different positions.

Optionally, setting the stationary area SA includes adjusting a size of a touch stroke corresponding to a touch. The touch stroke shows an area in the image selected by the touch. For example, touch stroke having different sizes can draw lines with different thicknesses. Optionally, adjusting the size of the touch stroke includes moving an icon ISS corresponding to sizes of the touch stroke along a size bar to select a target size of the touch stroke.

Figure 10:
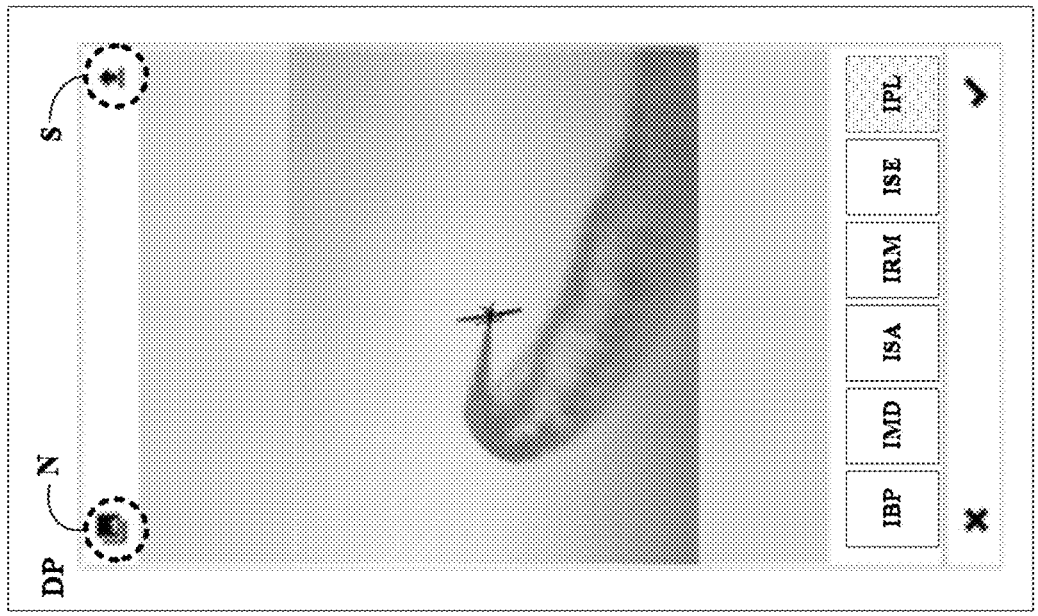
FIG. 10 is a schematic diagram showing a touch control display panel having icons corresponding to steps of rendering a regional dynamic movement effect on an image in some embodiments according to the present disclosure.

FIG. 10 is a schematic diagram showing a touch control display panel having icons corresponding to steps of rendering a regional dynamic movement effect on an image in some embodiments according to the present disclosure. In some embodiments, referring to FIG. 6 to FIG. 10, the computer-implemented method further includes generating an animation of the foreground object FO in the boundary area BA moving along the dynamic movement direction MD, thereby realizing a dynamic effect (e.g., the regional dynamic movement effect) in the image. Optionally, generating the animation of the foreground object FO further includes detecting a touch on an icon IPL to start or stop the animation of the foreground object FO.

Optionally, generating the animation of the foreground object in the boundary area includes dividing the boundary area into a plurality of sub-areas corresponding to the plurality of moving lines respectively having a plurality of dynamic moving directions. For example, there is no overlapping between the plurality of sub-areas. In another example, each position within the boundary area belongs to one of the plurality of sub-areas. Optionally, generating the animation of the foreground object in the boundary area further includes moving positions within a respective one of the plurality of sub-areas along a respective one of the plurality of moving lines and towards a respective one of the plurality of dynamic moving direction. For example, the further away a position within the respective one of the plurality of sub-areas to the respective one of the plurality of moving lines, the less movement of the animation of the position rendered. Optionally, generating the animation of the foreground object FO in the boundary area BA further includes prohibiting movements of positions within the stationary area SA. For example, when the stationary area SA and the boundary area BA overlaps, positions in both the stationary area SA and the boundary area BA remain still.

In one example, referring to FIG. 6, airplane exhaust fumes from an airplane in the image is within the boundary area BA, so that the airplane exhaust fumes are selected as the foreground object FO surrounded by the boundary points BP. Referring to FIG. 8, three moving lines (e.g., the first moving line ML1, the second moving line ML2, and the third moving line ML) respectively having three dynamic moving directions (e.g., the first dynamic moving direction MD1, the second dynamic moving direction MD2, and the third dynamic moving direction) are set within the boundary area BA. Positions within a sub-area corresponding to the first moving line ML1 moves along the first moving line ML1 and towards the first dynamic moving direction MD1. Positions within a sub-area corresponding to the second moving line ML2 moves along the second moving line ML2 and towards the second dynamic moving direction MD2. Positions within a sub-area corresponding to the third moving line ML3 moves along the third moving line ML3 and towards the third dynamic moving direction MD3. Optionally, nuances are added to movements of positions to form a more natural animation of the foreground object.

In another example, referring to FIG. 9, the stationary area SA corresponding to the airplane is set, in the process of generating the animation of the foreground object FO (e.g., the emission), while the positions within the boundary area BA is moving, the positions within the stationary area SA is not moving, e.g., the airplane exhaust fumes are moving while the airplane is keep still.

Optionally, the crossing icon x in the left lower corner of the touch control display panel is configured to reject a rendered dynamic effect, for example, the crossing icon x is configured to reject the animation of the foreground object. The check icon √ in the right lower corner of the touch control display panel is configured to accept the rendered dynamic effect, for example, the check icon √ is configured to accept the animation of the foreground object.

Figure 11:
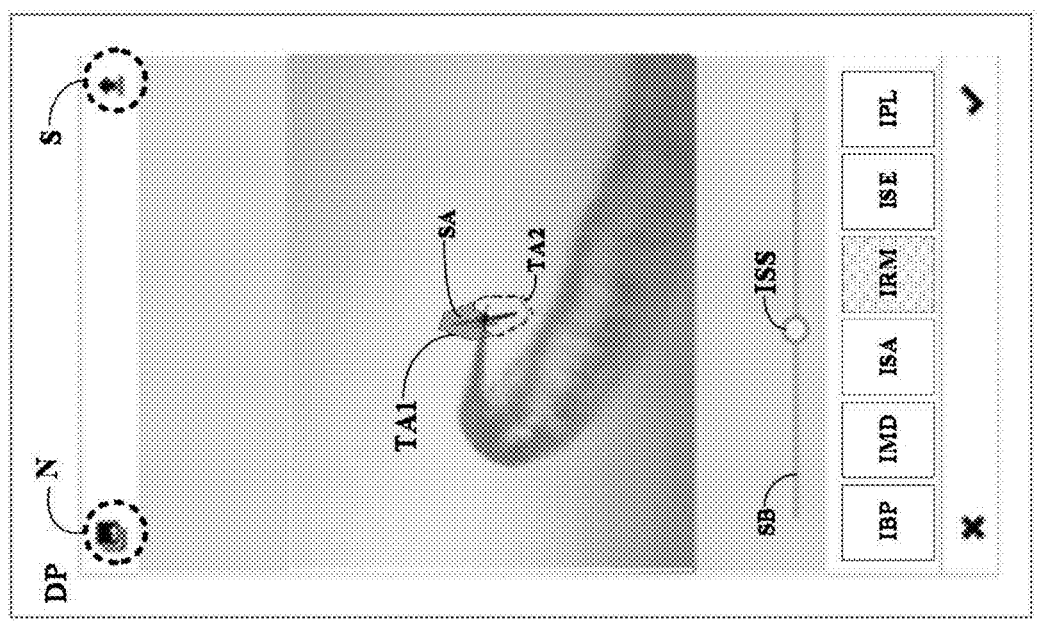
FIG. 11 is a schematic diagram showing a touch control display panel having icons corresponding to steps of rendering a regional dynamic movement effect on an image in some embodiments according to the present disclosure.

FIG. 11 is a schematic diagram showing a touch control display panel having icons corresponding to steps of rendering a regional dynamic movement effect on an image in some embodiments according to the present disclosure. In some embodiments, the computer-implemented method further includes removing at least a portion of the stationary area SA by detecting a second touch area TA2 corresponding to the portion of the stationary area SA on the touch control display panel DP.

Optionally, prior to removing at least the portion of the stationary area SA, the computer-implemented method further includes detecting a touch on an icon IRM to trigger a process of the removing at least the portion of the stationary area SA.

Optionally, removing at least a portion of the stationary area SA includes identifying the first touch area TA1; detecting and identifying the second touch area TA2; identifying an overlapping area between the first touch area TA1 and the second touch area TA2; extracting the overlapping area from the first touch area TA1.

Optionally, detecting and identifying the second touch area TA2 includes adjusting a size of a touch stroke corresponding to a touch. The touch stroke shows an area in the image selected by a touch. For example, touch stroke having different sizes can draw lines with different thicknesses. Optionally, adjusting the size of the touch stroke includes moving an icon ISS corresponding to sizes of the touch stroke along a size bar to select a target size of the touch stroke.

Figure 12:
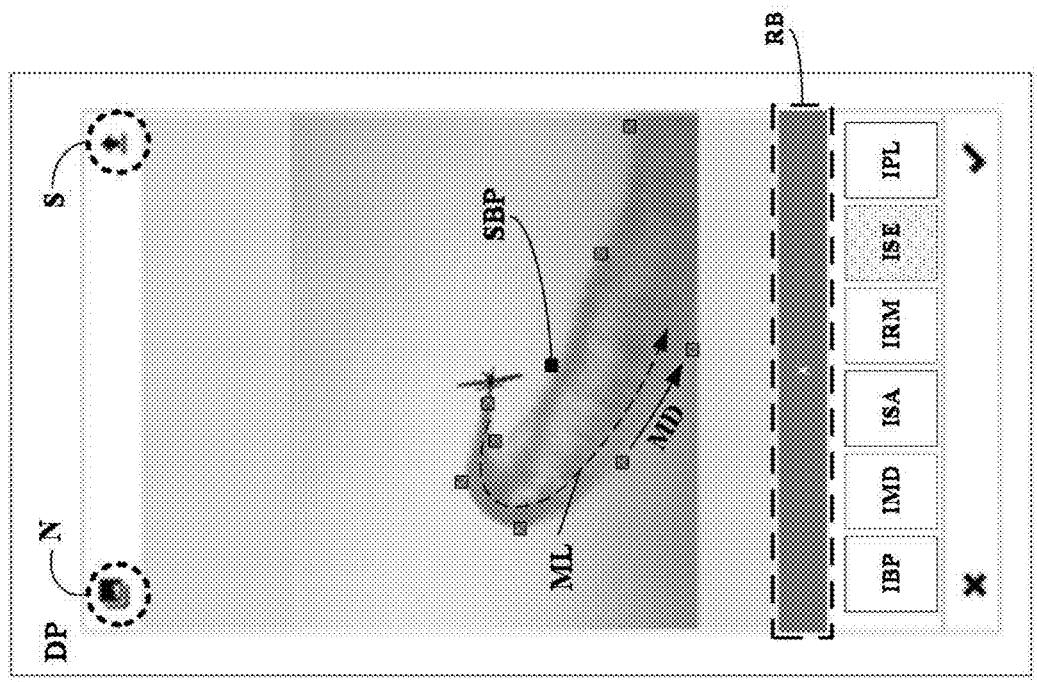
FIG. 12 is a schematic diagram showing a touch control display panel having icons corresponding to steps of rendering a regional dynamic movement effect on an image in some embodiments according to the present disclosure.

FIG. 12 is a schematic diagram showing a touch control display panel having icons corresponding to steps of rendering a regional dynamic movement effect on an image in some embodiments according to the present disclosure. In some embodiments, referring to FIG. 12, the computer-implemented method further includes removing one of the boundary points BP or the movement line ML.

Optionally, prior to removing one of the boundary points BP or the movement line ML, the computer-implemented method includes detecting a touch on an icon ISE to trigger a process of removing one of the boundary points BP or the movement line ML.

Optionally, removing the one of the boundary points BP or the movement line ML includes detecting a touch on the touch control display panel DP at a position corresponding to the one of the boundary points BP or the movement line ML.

In one example, referring to FIG. 12, removing the one of the boundary points BP includes detect the touch on the touch control display panel DP at a position corresponding to one of the boundary points BP; identifying the one of the boundary points BP as a selected boundary points SBP; detecting a touch on a removing bar RB; and removing the selected boundary points SBP.

In another example, removing the movement line ML includes detect the touch on the touch control display panel DP at a position corresponding to the moving line; identifying the moving line as a selected moving line; detecting a touch on the removing bar; and removing the selected moving line.

Figure 13:
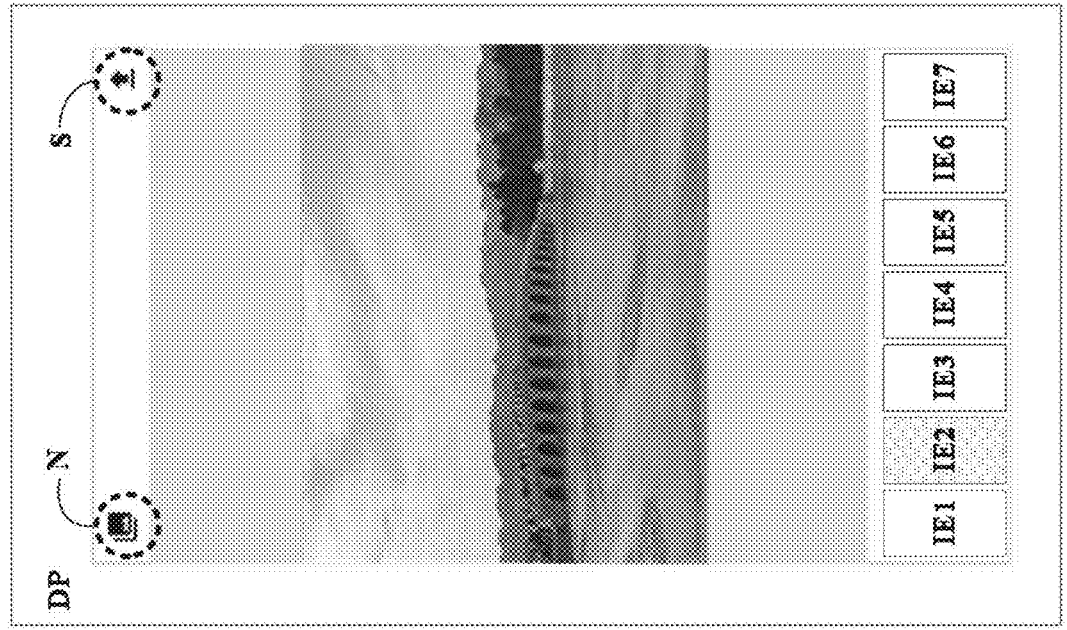
FIG. 13 is a schematic diagram showing a touch control display panel having icons corresponding to a plurality of dynamic effects realized in an image using a computer-implemented method in some embodiments according to the present disclosure.

FIG. 13 is a schematic diagram showing a touch control display panel having icons corresponding to a plurality of dynamic effects realized in an image using a computer-implemented method in some embodiments according to the present disclosure. In some embodiments, referring to FIG. 13, the computer-implemented method includes rendering the animated background effect in the image. Optionally, rendering the animated background effect in the image includes detecting a touch on an icon IE2 corresponding to the animated background effect, and inputting the image by detecting a touch on the icon N. Optionally, one or more objects in the image further includes a background object.

As used herein, the term "background object" refers to any object that is displayed as if it is under another object and/or appears as if it may have been printed under another object. In one example, a background object may be a text, a line, a frame, an item, or any other graphical object that is displayed, printed and/or appears to be overlapped by another object. In another example, a background object may be a color surrounding a foreground object. For example, the background object includes a sky, a sea, a river, a mountain, and a building in the image.

Figure 14:
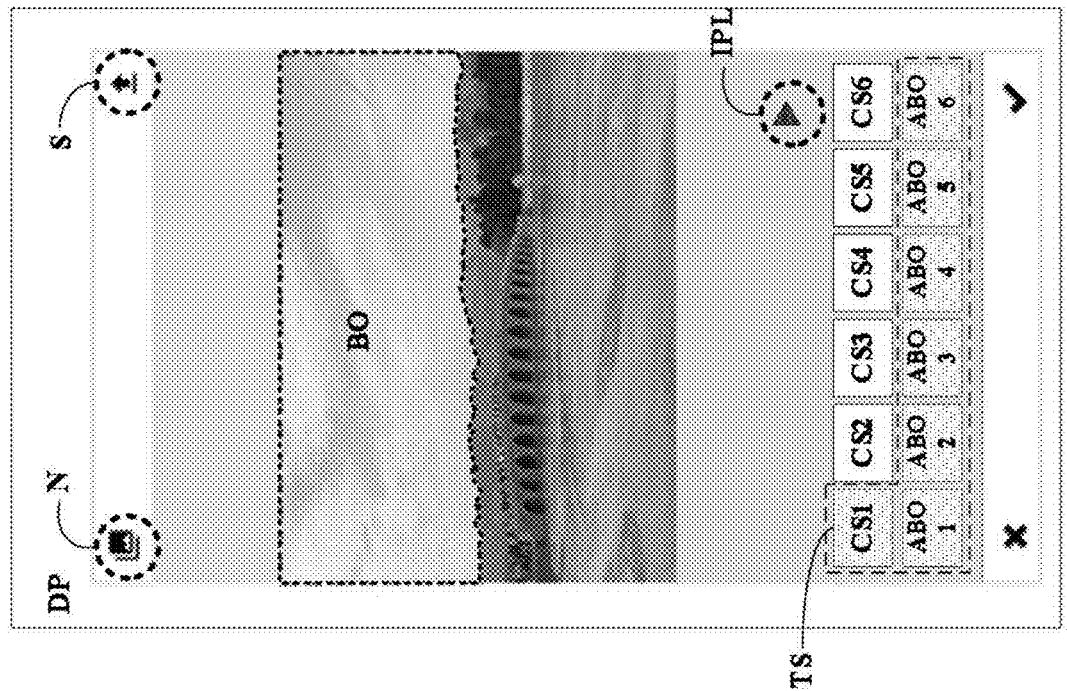
FIG. 14 is a schematic diagram showing a touch control display panel having icons corresponding to steps of rendering an animated background effect on an image in some embodiments according to the present disclosure.

FIG. 14 is a schematic diagram showing a touch control display panel having icons corresponding to steps of rendering an animated background effect on an image in some embodiments according to the present disclosure.

Optionally, referring to FIG. 13 and FIG. 14, subsequent to detecting the touch on the icon IE2, rendering the animated background effect in the image includes switching an interface of the touch control display panel DP having icons corresponding to the plurality of dynamic effects to an interface having icons corresponding to one or more steps of rendering the animated background effect on the image.

In some embodiments, referring to FIG. 14, the computer-implemented method includes segmenting the background object BO from the image. In one example, segmenting the background object BO from the image includes segmenting portions of the image corresponding to one or more objects including the foreground objects and background objects; and labeling portions of the images based on the one or more objects (e.g., with tags). In another example, a convolutional neural network is used in the process of segmenting and labeling portions of the image corresponding to the one or more objects. The convolutional neural network includes an attention network (e.g., dual attention network having positional attention module and channel attention module), and a conditional random field, and a pyramid pooling module to improve accuracy of a result of segmenting and labeling regions in the image.

Optionally, the computer-implemented method further includes selecting a target scene TS for the background object BO from a list of candidate scenes CS. Optionally, selecting the target scene TS includes providing the list of candidate scenes CS based on the background object BO; detecting a touch on an icon corresponding to one of the list of candidate scenes CS; selecting the one of the list of candidate scenes CS as the target scene TS. Optionally, a candidate scene of the list of candidate scenes CS is a category of background objects including a list of animated candidate background objects ABO. Optionally, animated candidate background objects in a same list have a same feature.

For example, the background object BO segmented from the image is a sky object. Based on the sky object, the list of candidate scenes CS provided includes a candidate scene CS1 of sky during the morning, a candidate scene CS2 of sky during the dusk, a candidate scene CS3 of sky having aurora, a candidate scene CS4 of sky during the night, a candidate scene CS5 of sky having fireworks display, and a CS6 candidate scene of sky having lightening. For example, a candidate scene CS1 of sky during the morning is a category including animated candidate skies during morning, e.g., an animated candidate sky object during morning shows a movement of sun ABO1, an animated candidate sky object during morning shows a movement of clouds ABO2, or an animated candidate sky object during morning shows a movement of birds in the sky ABO3.

Optionally, the computer-implemented method further includes replacing the background object BO with a target animated background object TABO based on the target scene TS. Optionally, prior to replacing the background object BO, the computer-implemented method further includes detecting a touch on an icon corresponding to an animated background object from the list of animated candidate background objects ABO; selecting the animated background object as the target animated background object TABO; and replacing the background object BO with the target animated background object TABO.

Figure 15:
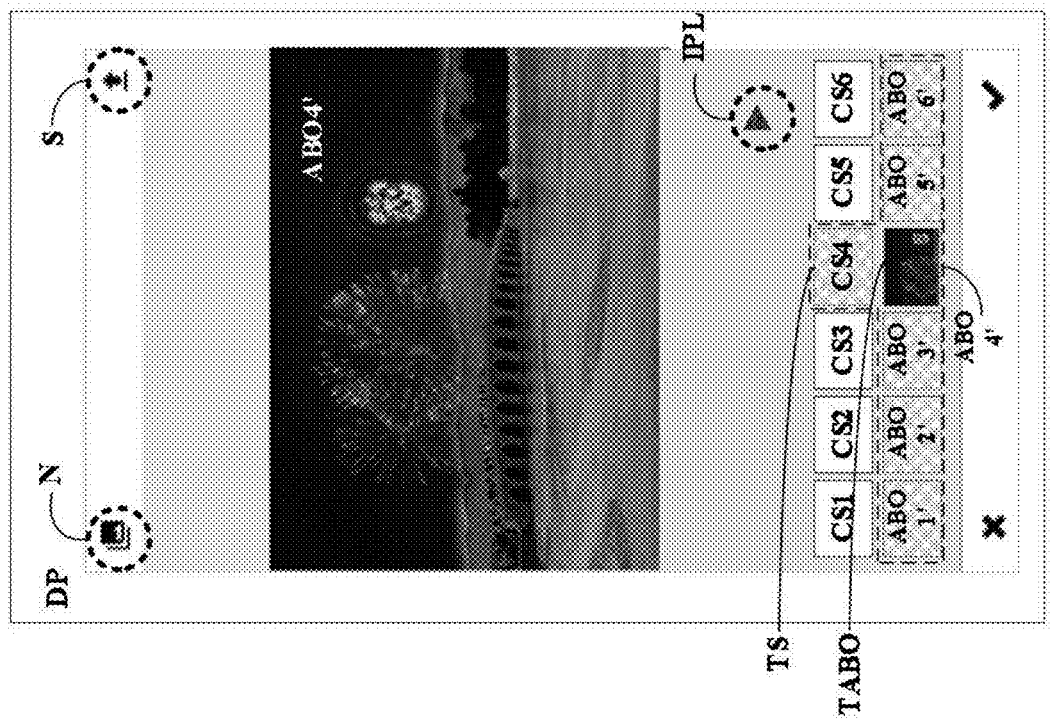
FIG. 15 is a schematic diagram showing a result of replacing a background object with a target animated background object in some embodiments according to the present disclosure.

FIG. 15 is a schematic diagram showing a result of replacing a background object with a target animated background object in some embodiments according to the present disclosure. For example, referring to FIG. 15, a list of candidate scenes CS corresponding to the background object BO (e.g., the sky object) is provided. The candidate scene CS4 (e.g., candidate scene of sky having fireworks display) are selected as the target scene TS. The candidate scene CS is a category including animated candidate skies having different types of fireworks display. The animated candidate sky ABO4' having three-flower pattern fireworks display is selected as the target animated background object TABO. So, the background object BO is replaced with the animated candidate sky ABO4' having three-flower pattern fireworks display.

Optionally, the computer-implemented method further includes adjusting a hue of the image to be biased toward a hue of the target scene TS. In one example, adjusting the hue of the image includes detecting the hue of the image; comparing the hue of the image and the hue of the target scene TS to obtain a hue difference; and adjusting the hue of the image based on the hue difference. In another example, adjusting the hue of the image includes detecting the hue of the image; comparing the hue of the image and the hue of the target animated background object TABO to obtain a hue difference; and adjusting the hue of the image based on the hue difference.

Figure 16:
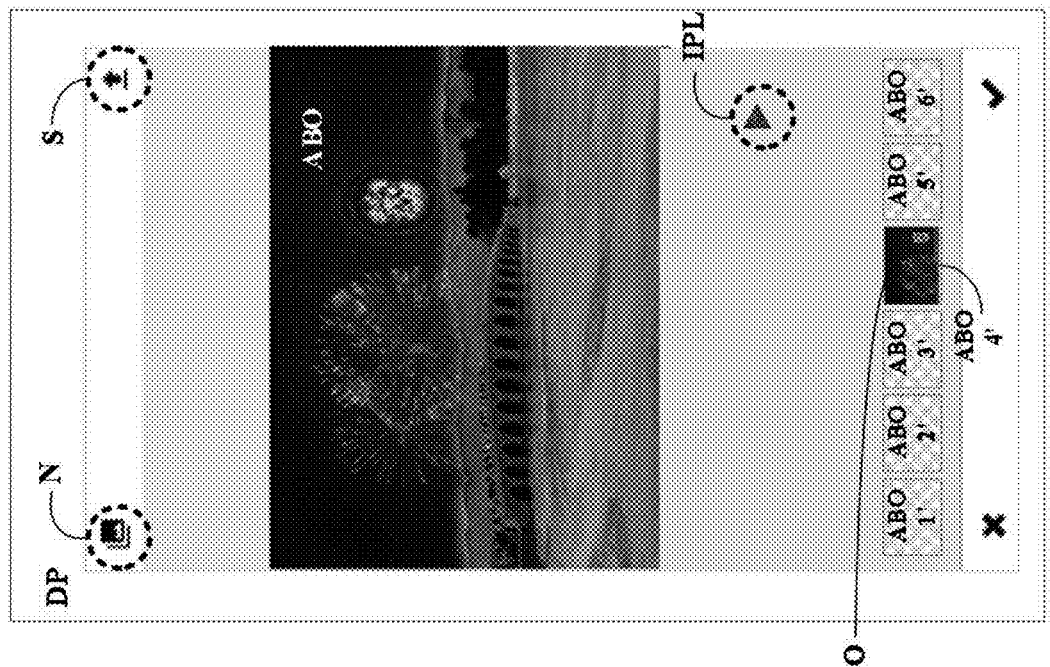
FIG. 16 is a schematic diagram showing a result of replacing a background object with a target animated background object in some embodiments according to the present disclosure.

FIG. 16 is a schematic diagram showing a result of replacing a background object with a target animated background object in some embodiments according to the present disclosure. Optionally, referring to FIG. 16, subsequent to segmenting the background object BO from the image, the computer-implemented method includes providing a list of animated candidate background objects ABO; detecting a touch on an icon corresponding to an animated background object among the list of animated candidate background objects; selecting the animated background object as a target animated back ground object TABO; replacing the background object with the target animated background object TABO; and adjusting the hue of the image to be biased toward the hue of the animated background object.

Optionally, referring to FIG. 15 and FIG. 16, the computer-implemented method further includes displaying the animation of the target animated background object. Optionally, a touch is detected on the icon IPL corresponding to a process of display at least the animation of the target animated background object to start or stop the animation of the animated background object.

Figure 17:
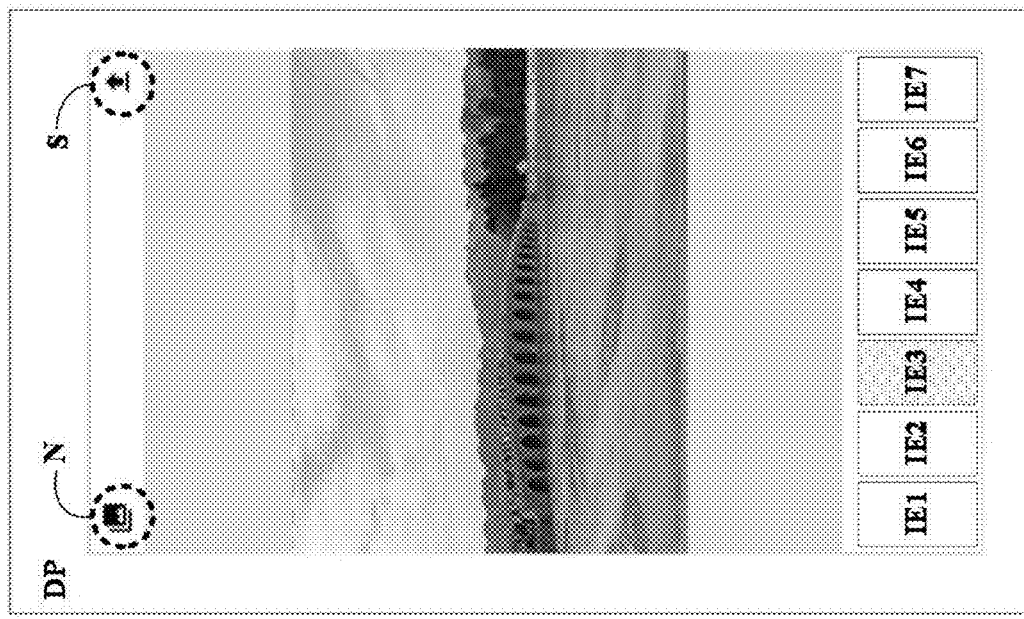
FIG. 17 is a schematic diagram showing a touch control display panel having icons corresponding to a plurality of dynamic effects realized in an image using a computer-implemented method in some embodiments according to the present disclosure.

FIG. 17 is a schematic diagram showing a touch control display panel having icons corresponding to a plurality of dynamic effects realized in an image using a computer-implemented method in some embodiments according to the present disclosure. In some embodiments, referring to FIG. 17, the computer-implemented method includes rendering the animated mask effect in the image. Optionally, rendering the animated mask effect in the image includes detecting a touch on an icon IE3 corresponding to the animated mask effect; and inputting the image by detecting a touch on the icon N.

Figure 18:
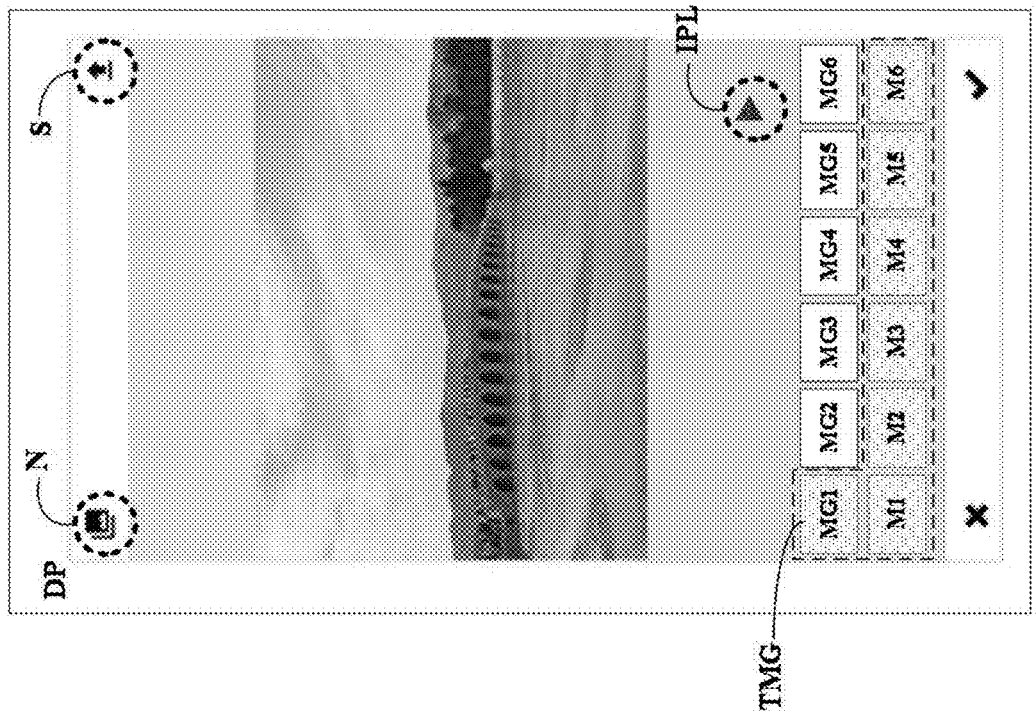
FIG. 18 is a schematic diagram showing a touch control display panel having icons corresponding to steps of rendering an animated mask effect on an image in some embodiments according to the present disclosure.
Figure 19:
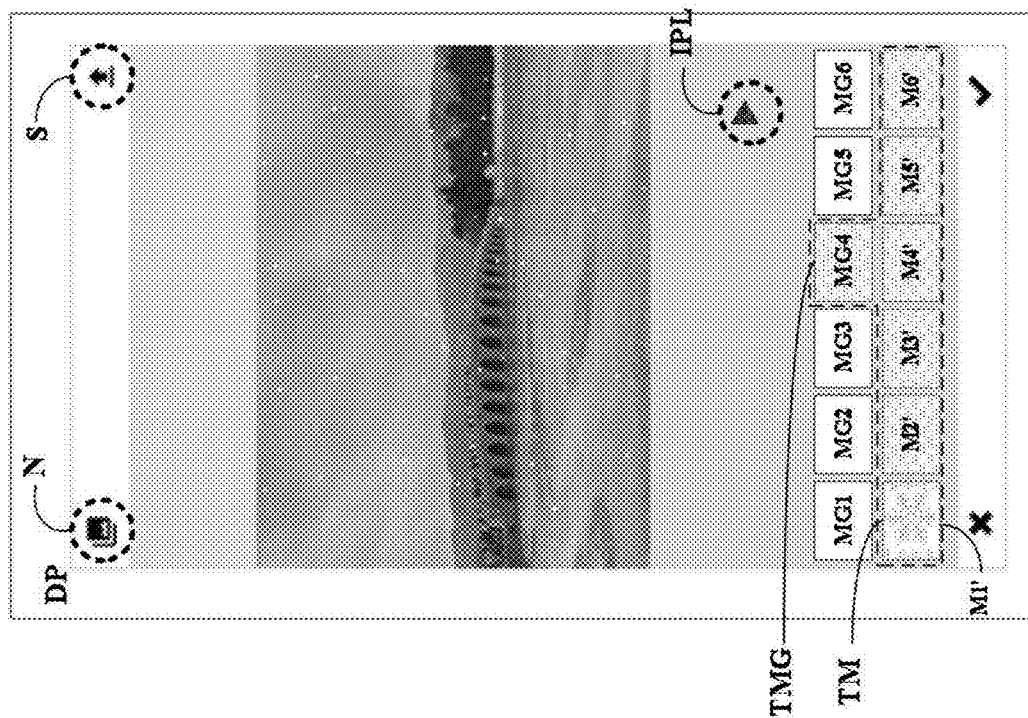
FIG. 19 is a schematic diagram showing a touch control display panel having icons corresponding to steps of rendering an animated mask effect on an image in some embodiments according to the present disclosure.

FIG. 18 is a schematic diagram showing a touch control display panel having icons corresponding to steps of rendering an animated mask effect on an image in some embodiments according to the present disclosure. FIG. 19 is a schematic diagram showing a touch control display panel having icons corresponding to steps of rendering an animated mask effect on an image in some embodiments according to the present disclosure.

Optionally, referring to FIG. 17 and FIG. 18, subsequent to detecting the touch on the icon IE3, rendering the animated mask effect in the image includes switching an interface of the touch control display panel DP having icons corresponding to the plurality of dynamic effects to an interface having icons corresponding to one or more steps of rendering the animated mask effect on the image.

In some embodiments, referring to FIG. 18 and FIG. 19, the computer-implemented method includes selecting a target animated mask TM from a list of candidate animated masks M. Optionally, selecting the target animated mask TM from the list of candidate animated masks M includes selecting a target mask group TMG from a list of mask groups MG. Optionally, selecting the target mask group TMG includes detecting a touch on an icon corresponding to a mask group in the list of mask groups MG; and selecting the mask group in the list of mask groups MG as the target mask group TMG. Optionally, the mask group in the list of mask groups MG includes a list of candidate animated masks M. For example, the list of mask groups MG includes, but is not limited to, a mask group MG1 of raining, a mask group MG2 of lightening, a mask group MG3 of bubbles, a mask group MG4 of snowing, a mask group MG5 of fallen leaves, and a mask group MG6 of irradiating light. For example, the mask group MG4 of snowing includes a mask M1' of light snow, a mask M2' of snowstorm, a mask M3' of blizzard.

Optionally, the computer-implemented method further includes overlaying a target animated mask TM on the image. Optionally, prior to overlaying the target animated mask TM on the image, the computer-implemented method further includes detecting a touch on an icon corresponding to a mask of the list of candidate animated masks M; selecting the mask of the list of candidate animated masks M as the target animated mask TM; and overlaying the target animated mask TM on the image. In one example, the target animated mask TM overlays a portion of the image. In another example, the target animated mask TM overlays the whole image.

For example, referring to FIG. 19, the list of mask groups MG is provided. The mask group MG4 of snowing is selected as the target mask group TMG. The mask M1' in the mask group MG4 of snowing is selected as the target animated mask TM, so the image is overlaid by the mask group MG4 of snowing.

Optionally, a hue of the image is adjusted to be biased toward a hue of the target animated mask TM. In one example, the hue of the image is adjusted by covering the hue of the target animated mask TM on the image. In another example, adjusting the hue of the image includes detecting the hue of the image; comparing the hue of the image and the hue of the target animated mask TM to obtain a hue difference; and adjusting the hue of the image based on the difference.

Figure 20:
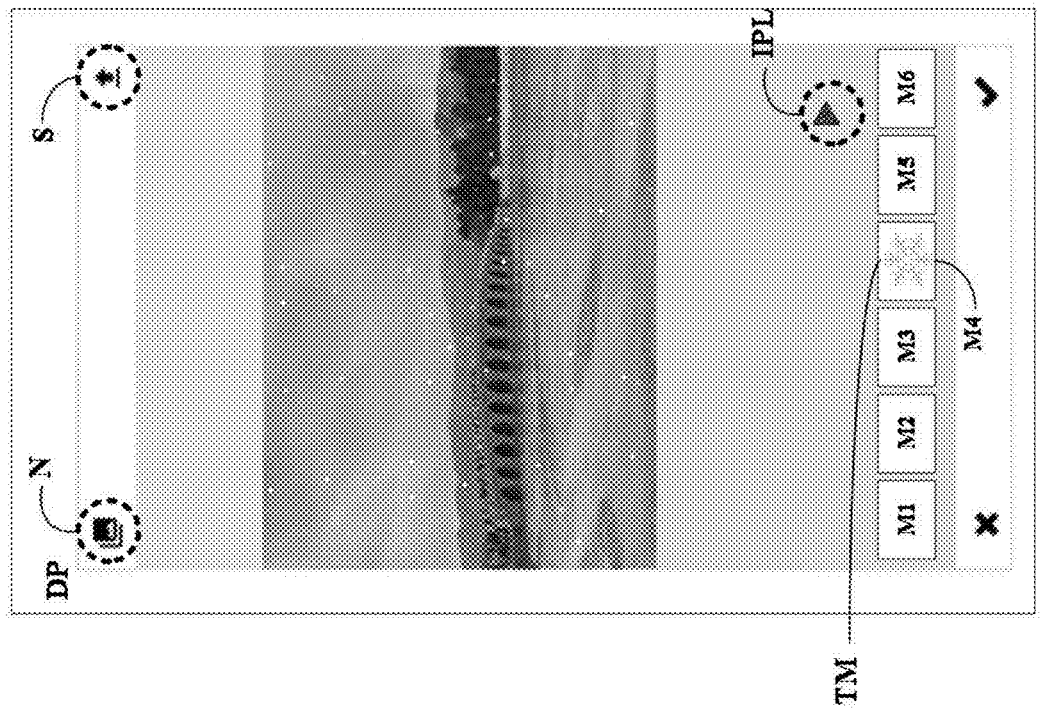
FIG. 20 is a schematic diagram showing a result of rendering an animated mask effect on an image in some embodiments according to the present disclosure.

FIG. 20 is a schematic diagram showing a result of rendering an animated mask effect on an image in some embodiments according to the present disclosure. Optionally, referring to FIG. 20, subsequent to inputting the image, the computer-implemented method includes selecting a target animated mask TM from a list of candidate animated masks M; and overlaying the target animated mask TM on the image. Optionally, a hue of the image is adjusted to be biased toward a hue of the target animated mask TM.

Optionally, referring to FIG. 19 and FIG. 20, the computer-implemented method further includes displaying the animation of the target animated mask TM. Optionally, a touch is detected on the icon IPL corresponding to a process of display at least the animation of the target animated mask TM to start or stop the animation of the target animated mask TM.

Figure 21:
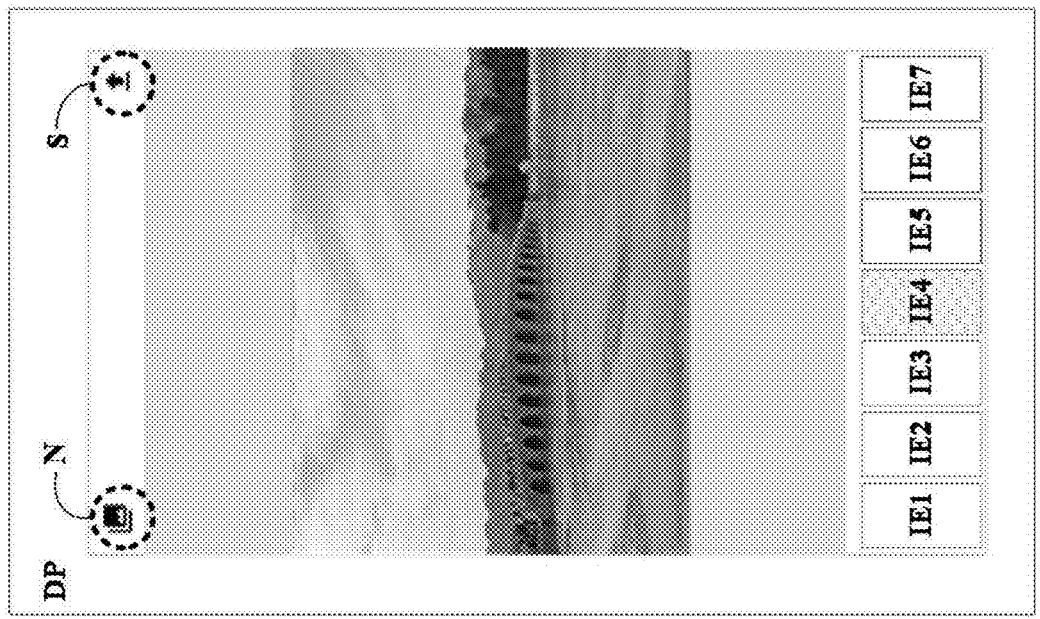
FIG. 21 is a schematic diagram showing a touch control display panel having icons corresponding to a plurality of dynamic effects realized in an image using a computer-implemented method in some embodiments according to the present disclosure.

FIG. 21 is a schematic diagram showing a touch control display panel having icons corresponding to a plurality of dynamic effects realized in an image using a computer-implemented method in some embodiments according to the present disclosure. In some embodiments, referring to FIG. 21, the computer-implemented method includes rendering the animated object effect in the image. Optionally, rendering the animated object effect in the image includes detecting a touch on an icon IE4 corresponding to the animated object effect; and inputting the image by detecting a touch on the icon N.

Figure 22:
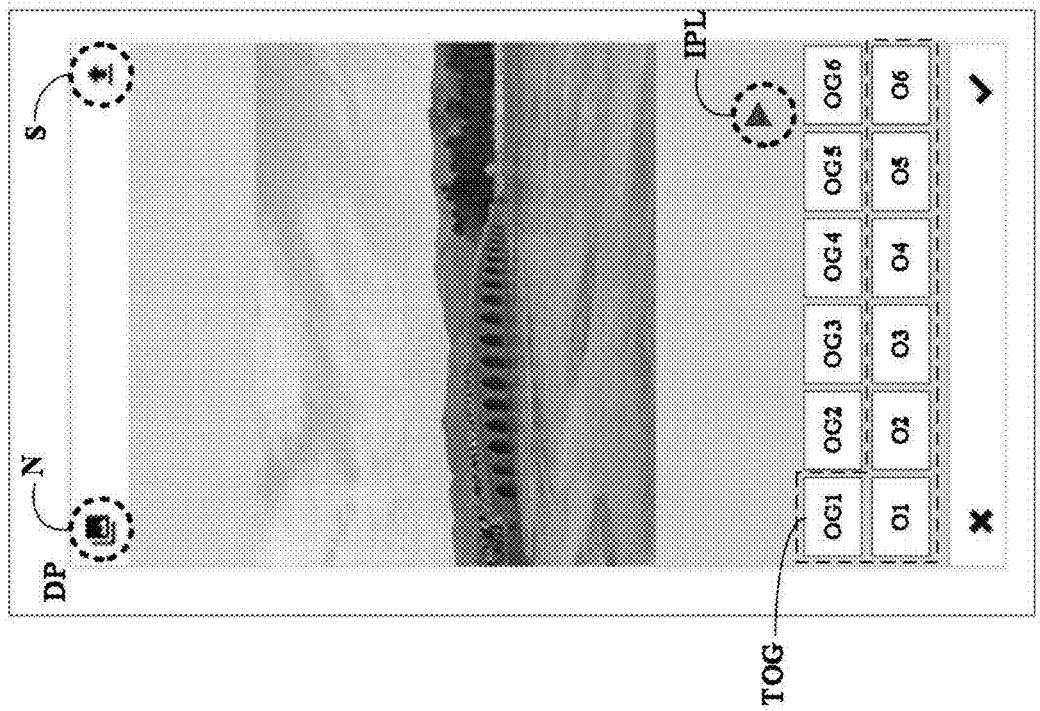
FIG. 22 is a schematic diagram showing a touch control display panel having icons corresponding to steps of rendering an animated object effect on an image in some embodiments according to the present disclosure.
Figure 23:
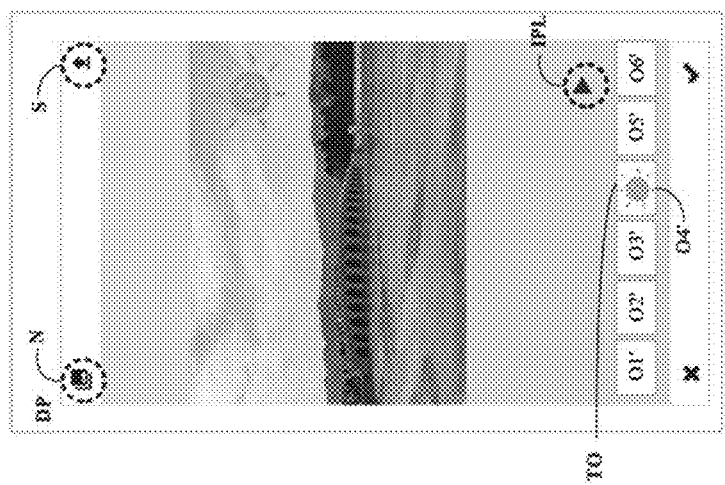
FIG. 23 is a schematic diagram showing a result of rendering an animated object effect on an image in some embodiments according to the present disclosure.

FIG. 22 is a schematic diagram showing a touch control display panel having icons corresponding to steps of rendering an animated object effect on an image in some embodiments according to the present disclosure. FIG. 23 is a schematic diagram showing a result of rendering an animated object effect on an image in some embodiments according to the present disclosure.

Optionally, referring to FIG. 21 and FIG. 22, subsequent to detecting the touch on the icon IE4, rendering the animated object effect in the image includes switching an interface of the touch control display panel DP having icons corresponding to the plurality of dynamic effects to an interface having icons corresponding to one or more steps of rendering animated object effect on the image.

In some embodiments, referring to FIG. 22 and FIG. 23, the computer-implemented method includes selecting a target animated object group TOG from a list of animated object groups OG. Optionally, selecting the target animated object group TOG includes detecting a touch on an icon corresponding to an animated object group in the list of animated object groups OG; and selecting the animated object group as the target animated object group TOG. Optionally, the animated object group in the list of animated object groups OG includes a list of candidate animated objects O. For example, the list of animated object groups OG includes, but is not limited to, an animated object group OG1 of plants, an animated object groups OG2 of animals, an animated object group OG3 of decorations, and an animated object group OG4 of nature phenomenon. The animated object group OG4 of nature phenomenon is selected as the target animated object group TOG.

Optionally, selecting a target animated object from a list of candidate animated objects further includes detecting a touch on an icon corresponding to an animated object in the list of candidate animated objects O of the target animated object group TOG; selecting the animated object as the target animated object TO. For example, the animated object group OG4 of nature phenomenon includes an animated object O1' of stars, an animated object O2' of the moon, an animated object O3' of clouds, and an animated object O4' of the sun. The animated object O4' of the sun is selected as the target animated object TO.

Optionally, the computer-implemented method further includes superimposing the target animated object TO on the image. Optionally, a size of the target animated object TO can be adjusted by touches of the user. Optionally, a position of the target animated object TO can be determined by touches of the user.

Figure 24:
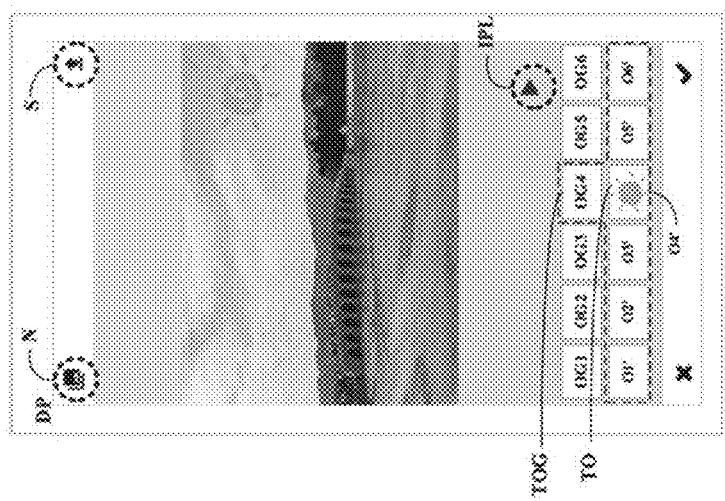
FIG. 24 is a schematic diagram showing a result of rendering an animated object effect on an image in some embodiments according to the present disclosure.

FIG. 24 is a schematic diagram showing a result of rendering an animated object effect on an image in some embodiments according to the present disclosure. Optionally, referring to FIG. 24, subsequent to inputting the image, the computer-implemented method includes selecting a target animated object TO from a list of candidate animated objects O; and superimposing the target animated object TO on the image.

Optionally, referring to FIG. 23 and FIG. 24, the computer-implemented method further includes displaying the target animated object TO. Optionally, a touch is detected on the icon IPL corresponding to a process of display at least the target animated object TO, to start or stop the animation of the target animated object TO.

Figure 25:
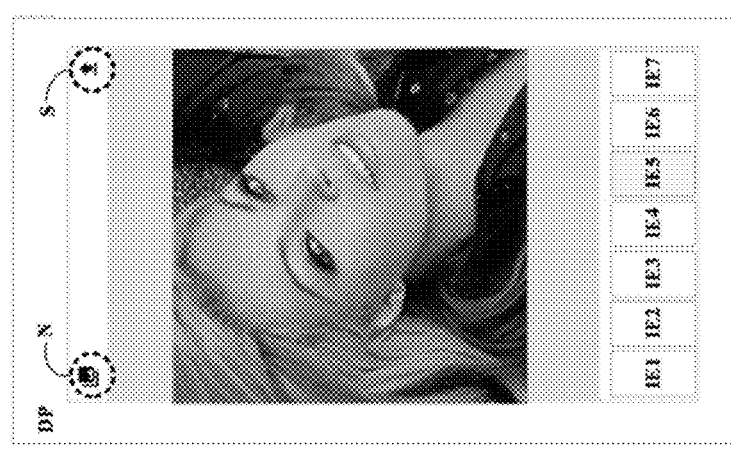
FIG. 25 is a schematic diagram showing a touch control display panel having icons corresponding to a plurality of dynamic effects realized in an image using a computer-implemented method in some embodiments according to the present disclosure.

FIG. 25 is a schematic diagram showing a touch control display panel having icons corresponding to a plurality of dynamic effects realized in an image using a computer-implemented method in some embodiments according to the present disclosure. In some embodiments, referring to FIG. 25, the computer-implemented method includes rendering the animated animal effect in the image. Optionally, rendering the animated animal effect in the image includes detecting a touch on an icon IE5 corresponding to the animated animal effect; and inputting the image by detecting a touch on the icon N.

Figure 26:
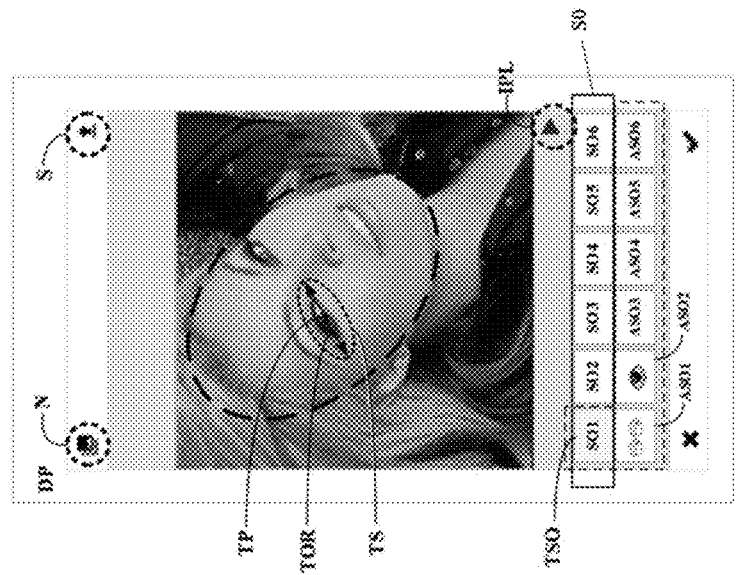
FIG. 26 is a schematic diagram showing a touch control display panel having icons corresponding to steps of rendering an animated animal effect on an image in some embodiments according to the present disclosure.
Figure 27:
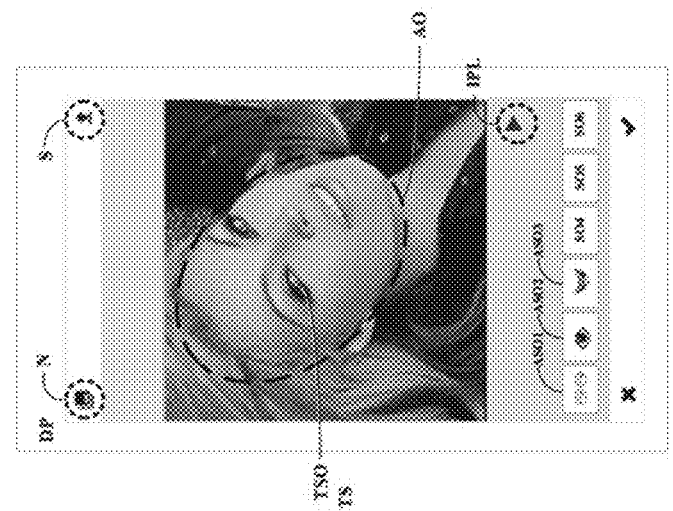
FIG. 27 is a schematic diagram showing a touch control display panel having icons corresponding to steps of rendering an animated animal effect on an image in some embodiments according to the present disclosure.

FIG. 26 is a schematic diagram showing a touch control display panel having icons corresponding to steps of rendering an animated animal effect on an image in some embodiments according to the present disclosure. FIG. 27 is a schematic diagram showing a touch control display panel having icons corresponding to steps of rendering an animated animal effect on an image in some embodiments according to the present disclosure.

Optionally, referring to FIG. 25 and FIG. 26, subsequent to detecting the touch on the icon IE5, rendering the animated animal effect in the image includes switching an interface of the touch control display panel DP having icons corresponding to the plurality of dynamic effects to an interface having icons corresponding to one or more steps of rendering the animated animal effect on the image.

In some embodiments, referring to FIG. 26 and FIG. 27, the computer-implemented method further includes rendering an animated animal effect on one or more objects in the image. Optionally, the one or more objects includes an animal object AO.

Optionally, the animal object AO is a body image of a subject. Optionally, the subject is selected from a group consisting of different kinds of animals including human. For example, the animal object AO is a facial image of a human. Optionally, the animal object AO includes a list of candidate sub-part objects SO. For example, the list of candidate sub-part objects SO include, but are not limited to, an eye object ASO1, ASO2, a mouth object ASO3, a nose object, an ear object, a neck object, a hand object, an arm object, a finger object, a leg object, a toe object, a lip object, an eyebrow object, a hair object, a knee object, and any portion thereof. In one example, referring to FIG. 26, icons corresponding to the list of candidate sub-part objects SO is shown on a bottom area of the touch control display panel. In another example, referring to FIG. 27, the list of candidate sub-part objects SO is triggered by touching on a portion of image corresponding to the list of candidate sub-part objects SO.

Optionally, subsequent to inputting the image, the computer-implemented method further includes automatically segmenting the animal object AO in the image into a plurality of segments. Optionally, the plurality of segments may be used as the plurality of candidate sub-part objects SO, e.g., a segment of the plurality of segments shows one of the plurality of candidate sub-part objects SO. Optionally, the computer-implemented method further includes automatically assigning labels to the plurality of segments corresponding to the plurality of candidate sub-part objects SO.

In one example, referring to FIG. 26, the computer-implemented method further includes selecting a target sub-part object TSO from the list of candidate sub-part objects SO. Optionally, selecting the target sub-part object TSO includes detecting a touch on an icon corresponding to one of the list of candidate sub-part objects SO; selecting the one of the list of candidate sub-part objects as the target sub-part object TSO. A segment corresponding to the one of the list of candidate sub-part objects is selected as the target segments TS. For example, a touch is detected on an icon SO1 corresponding to an eye object, the eye object is selected as the target sub-part object TSO. A segment corresponding to the eye object in the image is selected as the target segments TS.

In another example, referring to FIG. 27, selecting the target sub-part object TSO includes detecting a touch on the segment corresponding to one of the list of candidate sub-part object SO; selecting the segment corresponding to the one of the list of candidate sub-part object SO as the target segment TS; and selecting the one of the list of candidate sub-part object SO as the target sub-part object TSO. For example, a touch is detected on a segment corresponding to an eye object, therefore the segment showing the eye object is selected as the target segment TS, and the eye object is selected as the target sub-part object TSO.

Optionally, referring to FIG. 26 and FIG. 27, the computer-implemented method further includes automatically detecting a target position TP and a target orientation TOR of the target sub-part object TSO in the animal object AO. Optionally, the target position TP of the target sub-part object TSO is detected based on the target segment TS corresponding to the target sub-part object TSO. Optionally, the target orientation TOR of the target sub-part object TSO is detected based on the texture of the target segment TS corresponding to the target sub-part object TSO. For example, referring to FIG. 26, the target segment TS corresponding to target sub-part object TSO (e.g., an eye object) shows an eye. The target position TP of the target sub-part object TSO is a position of a pupil of the eye. The target orientation TOR of the target sub-part object TSO is an extension orientation of the eye.

Figure 28:
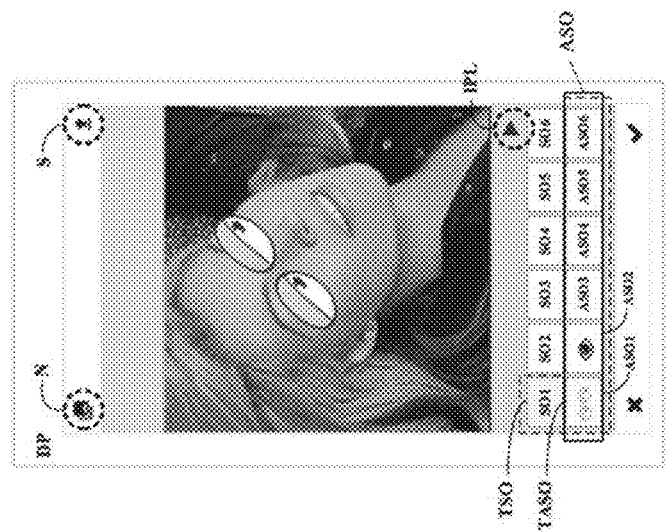
FIG. 28 is a schematic diagram showing a touch control display panel having icons corresponding to steps of rendering an animated animal effect_on an image in some embodiments according to the present disclosure.
Figure 29:
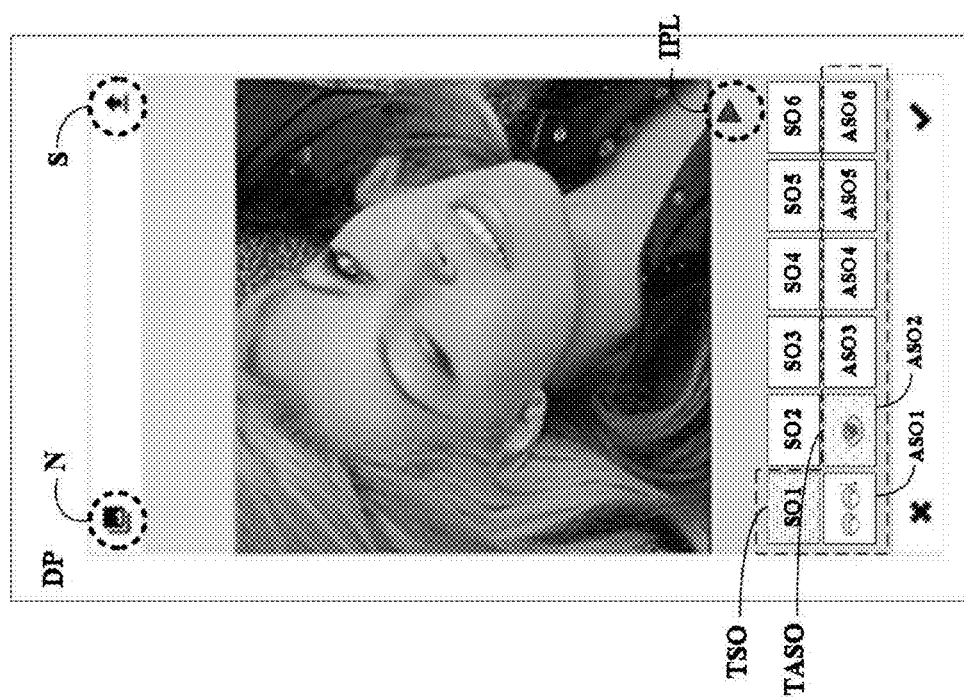
FIG. 29 is a schematic diagram showing a touch control display panel having icons corresponding to steps of rendering an animated animal effect on an image in some embodiments according to the present disclosure.

FIG. 28 is a schematic diagram showing a touch control display panel having icons corresponding to steps of rendering an animated animal effect_on an image in some embodiments according to the present disclosure. FIG. 29 is a schematic diagram showing a touch control display panel having icons corresponding to steps of rendering an animated animal effect_on an image in some embodiments according to the present disclosure. Optionally, referring to FIG. 28 and FIG. 29, the computer-implemented method further includes automatically replacing the target sub-part object TSO with a target animated sub-part object TASO at the target position TP and along the target orientation TOR. Optionally, the target animated sub-part object TASO has an animated movement. For example, when the target sub-part object TSO is selected, a plurality of animated sub-part objects ASO are provided.

In one example, referring to FIG. 28, when the eye object is selected as the target sub-part object TSO, a plurality of animated sub-part objects ASO having animation on the eye is provided. For example, the plurality of animated sub-part objects ASO includes a cartoon winking eye, and a winking eye of the subject in the image. A touch is detected on an icon corresponding to the cartoon winking eye ASO1, the eye object in the image is replaced by the cartoon winking eye.

In another example, referring to FIG. 29, a touch is detected on an icon ASO2 corresponding to the winking eye of the subject in the image, the eye object in the image preforms the winking action.

Figure 30:
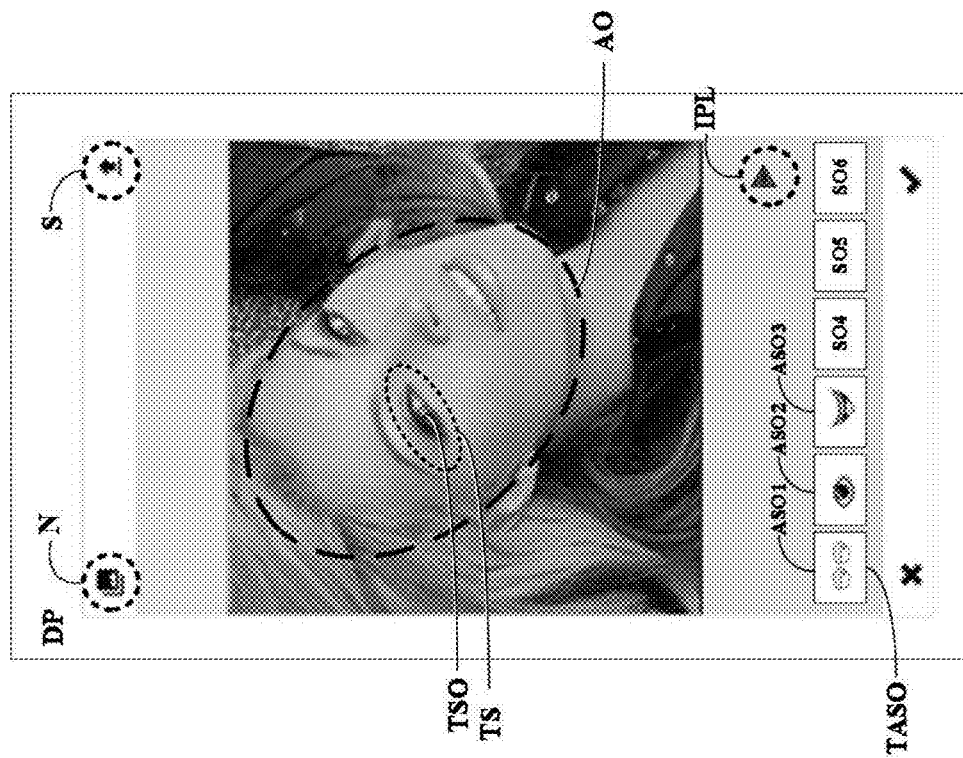
FIG. 30 is a schematic diagram showing a touch control display panel having icons corresponding to steps of rendering an animated animal effect_on an image in some embodiments according to the present disclosure.

FIG. 30 is a schematic diagram showing a touch control display panel having icons corresponding to steps of rendering an animated animal effect_on an image in some embodiments according to the present disclosure. In some embodiments, referring to FIG. 30, the computer-implemented method includes detecting a touch on a target animated sub-part object TASO of a plurality of animated sub-part objects ASO. For example, the target animated sub-part object TASO corresponds to a target sub-part object TSO in a list of candidate sub-part object SO in the image. Optionally, the computer-implemented method further includes automatically segmenting the image into a plurality of segments; automatically assigning labels of the list of candidate sub-part object SO to the plurality of segments, respectively; automatically locating a target segment TS corresponding to the target sub-part object TSO; automatically detecting a target position and a target orientation of the target sub-part object TSO based on information and texture of the target segment TS; and automatically replacing the target sub-part object TSO with a target animated sub-part object TASO at the target position and along the target orientation.

Optionally, referring to FIG. 28 and FIG. 29, the computer-implemented method further includes displaying the target animated sub-part object TASO. Optionally, a touch is detected on the icon IPL corresponding to a process of display at least the target animated sub-part object TASO to start or stop the animation of the target animated sub-part object TASO.

Figure 31:
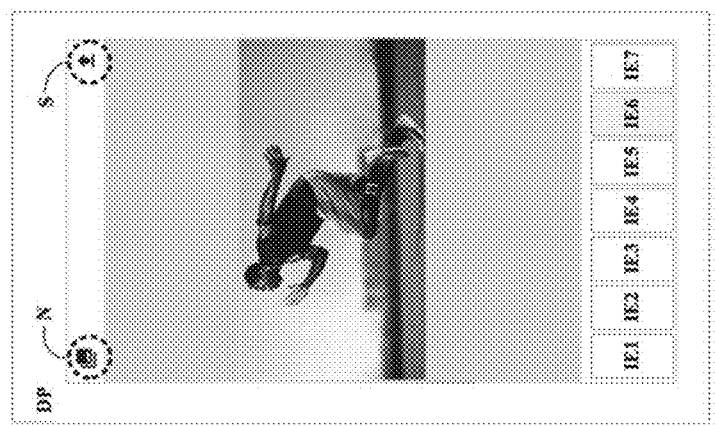
FIG. 31 is a schematic diagram showing a touch control display panel having icons corresponding to a plurality of dynamic effects realized in an image using a computer-implemented method in some embodiments according to the present disclosure.

FIG. 31 is a schematic diagram showing a touch control display panel having icons corresponding to a plurality of dynamic effects realized in an image using a computer-implemented method in some embodiments according to the present disclosure. In some embodiments, referring to FIG. 31, the computer-implemented method includes rendering the overall dynamic movement effect in the image. Optionally, rendering the overall dynamic movement effect in the image includes detecting a touch on an icon IE6 corresponding to the overall dynamic movement effect; and inputting the image by detecting a touch on the icon N.

Figure 32:
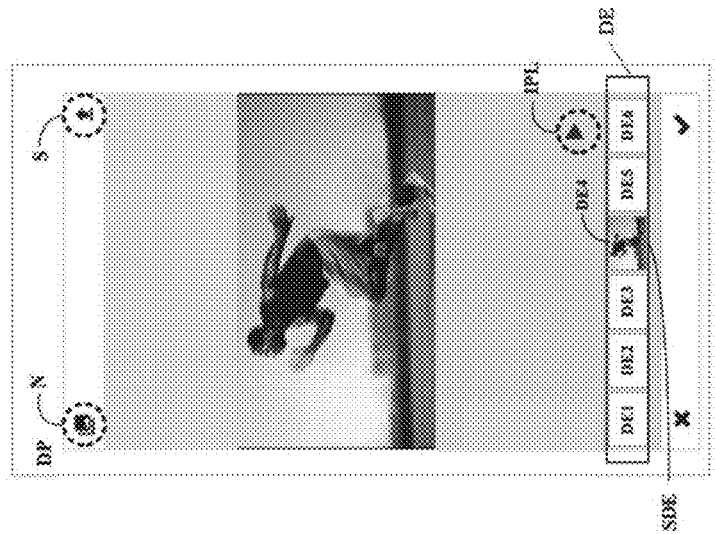
FIG. 32 is a schematic diagram showing a touch control display panel having icons corresponding to steps of rendering an overall dynamic movement effect on an image in some embodiments according to the present disclosure.

FIG. 32 is a schematic diagram showing a touch control display panel having icons corresponding to steps of rendering an overall dynamic movement effect on an image in some embodiments according to the present disclosure. Optionally, referring to FIG. 31 and FIG. 32, subsequent to detecting the touch on the icon IE6, rendering the overall dynamic movement effect in the image includes switching an interface of the touch control display panel DP having icons corresponding to the plurality of dynamic effects to an interface having icons corresponding to one or more steps of rendering the overall dynamic movement effect on the image.

Referring to FIG. 32, in some embodiments, the computer-implemented method further includes rendering a special dynamic effect on the image as a whole. Optionally, prior to rendering the special dynamic effect, the computer-implemented method further includes selecting the special dynamic effect SDE from a plurality of overall dynamic movement effects DE including a zooming-in effect, a zooming-out effect, an oscillation effect, a transition from a distal view to a close-up view, a flipping effect, a TV snowflake effect, and an effect of adding various sound to the image. For example, a touch is detected on an icon corresponding to an overall dynamic effect of shaking the image DE4, so that the overall dynamic effect of shaking the image DE4 is selected as the special dynamic effect SDE. The overall dynamic effect of shaking the image DE4 is rendered on the image of a running man, which provides a visual illusion that the man is running very fast.

Optionally, referring to FIG. 32, the computer-implemented method further includes displaying the image having the special dynamic effect SDE. Optionally, a touch is detected on the icon IPL corresponding to a process of display at least the image having the special dynamic effect SDE to start or stop the special dynamic effect SDE.

FIG. 33 is a schematic diagram showing a touch control display panel having icons corresponding to a plurality of dynamic effects realized in an image using a computer-implemented method in some embodiments according to the present disclosure. In some embodiments, referring to FIG. 33, the computer-implemented method includes rendering the animated cartoon effect in the image. Optionally, rendering the animated cartoon effect in the image includes detecting a touch on an icon IE7 corresponding to the animated cartoon effect; and inputting the image by detecting a touch on the icon N. Optionally, the image is selected from a database. Optionally, the image is a real-time image captured using a camera.

FIG. 34 is a schematic diagram showing a touch control display panel having icons corresponding to steps of rendering an animated cartoon effect on an image in some embodiments according to the present disclosure. Optionally, referring to FIG. 33 and FIG. 34, subsequent to detecting the touch on the icon IE7, rendering the animated cartoon effect in the image includes switching an interface of the touch control display panel DP having icons corresponding to the plurality of dynamic effects to an interface having icons corresponding to one or more steps of rendering the animated cartoon effect on the image.

In some embodiments, referring to FIG. 34, the computer-implemented method further includes selecting a target cartoon object TCO from a list of candidate cartoon objects CO. Optionally, the list of candidate cartoon objects CO includes, but is not limited to, a cartoon object different from the animal object AO in the image, and a cartoon object similar to the animal object AO. For example, when the animal object AO is a human facial image, the cartoon object different from the animal object AO in the image is a cartoon cat facial image different from the human facial image. The cartoon object similar to the animal object AO is a cartoon human facial image similar to the human facial image, e.g., a cartoonized human facial image. Optionally, selecting the target cartoon object TCO includes detecting a touch on an icon corresponding to a cartoon object in the list of candidate carton objects CO; selecting the cartoon object as the target cartoon object TCO. For example, a cartoon object COI similar to the animal object AO in the list of candidate cartoon objects CO is selected as the target cartoon object TCO.

Optionally, subsequent to selecting the target cartoon object, the computer-implemented method further includes identifying a position of the animal object AO.

Optionally, the computer-implemented method further includes superimposing the target cartoon object TCO on the image to generate a synthetic object SYO having the target cartoon object TCO. Optionally, superimposing the target cartoon object TCO includes superimposing the target cartoon object TCO on the position of the animal object AO.

Optionally, subsequent to superimposing the target cartoon object TCO, the computer-implemented method further includes identifying sub-part objects in the synthetic object SYO. For example, sub-part objects include, but are not limited to an eye object, a nose object, a mouth object, an eyebrow object, an ear object, a neck object, a shoulder object, an arm object, and a hand object.

Optionally, the computer-implemented method further includes using a camera to capture a video stream of a subject in real time (e.g., a video stream of the animal object in real time). Optionally, the video stream of the subject in real time is processed to identify sub-parts of the subject respectively corresponding to the sub-part objects of the synthetic object SYO.

Optionally, the computer-implemented method further includes generating a video of the synthetic object SYO having movement synchronized with a movement of the subject simultaneously. Optionally, generating the video of the synthetic object SYO further includes detecting a movement of the sub-parts of the subject in the video stream of the subject in real time; and generating a movement of the sub-part object of the synthetic object SYO similar to the movement of the sub-parts of the subject in the video stream of the subject in real time.

Optionally, the computer-implemented method further includes recording the video of the synthetic object. Optionally, a touch is detected on an icon R corresponding to a process of recording the video, to star or stop recording the real time movement of the synthetic object SYO to obtain the video of the synthetic object SYO.

Optionally, the computer-implemented method further includes displaying the video of the synthetic object. Optionally, a touch is detected on the icon IPL corresponding to a process of display at least the video of the synthetic object to start or stop the video of the synthetic object.

In another aspect, the present disclosure provides an apparatus for realizing a dynamic effect in an image. In some embodiments, the apparatus for realizing the dynamic effect in the image includes a touch control display panel; a memory; one or more processors. Optionally, the memory and the one or more processors are connected with each other. Optionally, the memory stores computer-executable instructions for controlling the one or more processors to rendering a dynamic effect to one or more objects in the image. Optionally, the one or more objects include a foreground object.

Optionally, the memory stores computer-executable instructions for controlling the one or more processors to set boundary points surrounding the foreground object to define a boundary area in which a dynamic movement is to be realized, wherein the boundary points are defined by touch positions on the touch control display panel in which the image is displayed; set a movement line to define a dynamic movement direction along which the dynamic movement is to be realized, wherein the movement line is defined by a continuous touch over different positions on the touch control display panel; set a stationary area to define an area in which the dynamic movement is prohibited, wherein the stationary area is defined by a first touch area corresponding to the stationary area on the touch control display panel; and generate an animation of the foreground object in the boundary area moving along the dynamic movement direction.

In some embodiments, the memory further stores computer-executable instructions for controlling the one or more processors to remove at least a portion of the stationary area defined by a second touch area on the touch control display panel; and remove one of the boundary points or the movement line upon detection a touch on the touch control display panel at a position corresponding to the one of the boundary points or the movement line.

In some embodiments, one or more objects further include a background object. Optionally, the memory further stores computer-executable instructions for controlling the one or more processors to segment the background object from the image; select a target scene for the background object from a list of candidate scenes; replace the background object with a target animated background object based on the target scene; and adjust a hue of the image to be biased toward a hue of the target scene.

In some embodiments, the memory further stores computer-executable instructions for controlling the one or more processors to select a target animated mask from a list of candidate animated masks; overlay the target animated mask on the image. Optionally, a hue of the image is adjusted to be biased toward a hue of the target animated mask.

In some embodiments, the memory further stores computer-executable instructions for controlling the one or more processors to select a target animated object from a list of candidate animated objects; and superimpose the target animated object on the image.

In some embodiments, the memory further stores computer-executable instructions for controlling the one or more processors to select a target sub-part object from a list of candidate sub-part objects; automatically detect a target position and a target orientation of the target sub-part object in the animal object; and automatically replace the target sub-part object with a target animated sub-part object at the target position and along the target orientation. Optionally, the animated sub-part object has an animated movement.

Optionally, the animal object is a body image of a subject. Optionally, the target sub-part object of the animal object is selected from a group consisting of an eye object, a mouth object, a nose object, an ear object, a neck object, a hand object, an arm object, a finger object, a leg object, a toe object, a lip object, an eyebrow object, a hair object, a knee object, and any portion thereof.

In some embodiments, the memory further stores computer-executable instructions for controlling the one or more processors to render a special dynamic effect on the image as a whole.

Optionally, the special dynamic effect is selected from a group consisting of a zooming-in effect, a zooming-out effect, an oscillation effect, a transition from a distal view to a close-up view, a flipping effect, and a TV snowflake effect.

In some embodiments, the apparatus further includes a camera configured to capture a video stream of a subject in real time. Optionally, the memory further stores computer-executable instructions for controlling the one or more processors to select a target cartoon object from a list of candidate cartoon objects; superimpose the target cartoon object on the image to generate a synthetic object having the target cartoon object; use the camera to capture a video steam of a subject in real time; and generate a video of the synthetic object having movement synchronized with a movement of the subject in the video stream.

In another aspect, the present disclosure also provides a computer-program product including a non-transitory tangible computer-readable medium having computer-readable instructions thereon. In some embodiments, the computer-readable instructions are executable by a processor to cause the processor to perform rendering a dynamic effect to one or more objects in an image. Optionally, the one or more objects include a foreground object. Optionally, the computer-readable instructions are executable by a processor to cause the processor to perform setting boundary points surrounding the foreground object to define a boundary area in which a dynamic movement is to be realized, wherein the boundary points are set by touch positions on a touch control display panel in which the image is displayed; setting a movement line to define a dynamic movement direction along which the dynamic movement is to be realized, wherein the movement line is set by a continuous touch over different positions on the touch control display panel; setting a stationary area to define an area in which the dynamic movement is prohibited, wherein the stationary area is set by a first touch area on the touch control display panel; and generating an animation of the foreground object in the boundary area moving along the dynamic movement direction.

In some embodiments, the computer-readable instructions are executable by a processor to cause the processor to perform removing at least a portion of the stationary area defined by a second touch area on the touch control display panel; and removing one of the boundary points or the movement line upon detection a touch on the touch control display panel at a position corresponding to the one of the boundary points or the movement line.

In some embodiments, the computer-readable instructions are executable by a processor to cause the processor to perform segmenting the background object from the image; selecting a target scene for the background object from a list of candidate scenes; replacing the background object with an target animated background object based on the target scene; and adjusting a hue of the image to be biased toward a hue of the target scene.

In some embodiments, the computer-readable instructions are executable by a processor to cause the processor to perform selecting a target animated mask from a list of candidate animated masks; overlay the target animated mask on the image. Optionally, a hue of the image is adjusted to be biased toward a hue of the target animated mask.

In some embodiments, the computer-readable instructions are executable by a processor to cause the processor to perform selecting a target animated object from a list of candidate animated objects; and superimposing the target animated object on the image.

In some embodiments, the computer-readable instructions are executable by a processor to cause the processor to perform selecting a target sub-part object from a list of candidate sub-part objects; automatically detecting a target position and a target orientation of the target sub-part object in the animal object; and automatically replacing the target sub-part object with a target animated sub-part object at the target position and along the target orientation. Optionally, the animated sub-part object has an animated movement.

Optionally, the animal object is a body image of a subject. Optionally, the target sub-part object of the animal object is selected from a group consisting of an eye object, a mouth object, a nose object, an ear object, a neck object, a hand object, an arm object, a finger object, a leg object, a toe object, a lip object, an eyebrow object, a hair object, a knee object, and any portion thereof.

In some embodiments, the computer-readable instructions are executable by a processor to cause the processor to perform rendering a special dynamic effect on the image as a whole.

Optionally, the special dynamic effect is selected from a group consisting of a zooming-in effect, a zooming-out effect, an oscillation effect, a transition from a distal view to a close-up view, a flipping effect, and a TV snowflake effect.

In some embodiments, the computer-readable instructions are executable by a processor to cause the processor to perform selecting a target cartoon object from a list of candidate cartoon objects; superimposing the target cartoon object on the image to generate a synthetic object having the target cartoon object; using the camera to capture a video steam of a subject in real time; and generating a video of the synthetic object having movement synchronized with a movement of the subject in the video stream.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, comprising rendering a dynamic effect to one or more objects in a static image;
wherein the one or more objects comprise a foreground object;
wherein the method comprises:
setting boundary points surrounding the foreground object to define a boundary area in which a dynamic movement is to be realized, wherein setting the boundary points comprises detecting touch positions corresponding to the boundary points on a touch control display panel in which the static image is displayed;
setting a movement line to define a dynamic movement direction along which the dynamic movement is to be realized, wherein setting the movement line comprises detecting a continuous touch over different positions on the touch control display panel;

setting a stationary area to define an area in which the dynamic movement is prohibited, wherein setting the stationary area comprises detecting a first touch area corresponding to the stationary area on the touch control display panel;

generating an animation of the foreground object in the boundary area moving along the dynamic movement direction, thereby realizing the dynamic effect in the static image; and removing the movement line;

wherein removing the movement line comprises detecting a touch on the touch control display panel at a position corresponding to the movement line;

wherein setting the boundary points surrounding the foreground object to define the boundary area in which a dynamic movement is to be realized comprises forming a boundary region by setting two immediately adjacent boundary points;

wherein a boundary of the boundary area comprises multiple boundary regions respectively formed by respective pairs of immediately adjacent boundary points;

the closer a position in the boundary region is to a respective boundary point, the less a movement of the animation of the foreground object is rendered; and the further away a position in the boundary region is from a center of the boundary area, the less a movement of the animation of the foreground object is rendered.

2. The computer-implemented method of claim 1, further comprising removing at least a portion of the stationary area by detecting a second touch area corresponding to the portion of the stationary area on the touch control display panel.

3. The computer-implemented method of claim 1, further comprising removing the boundary points;
  wherein removing the boundary points comprises detecting a touch on the touch control display panel at a position corresponding to the boundary points.

4. The computer-implemented method of claim 1, wherein the one or more objects further comprise a background object;
  wherein the method further comprises:
    segmenting the background object from the static image;
    selecting a target scene for the background object from a list of candidate scenes;
    replacing the background object with a target animated background object based on the target scene; and
    adjusting a hue of the static image to be biased toward a hue of the target scene.

5. The computer-implemented method of claim 1, further comprising:
  selecting a target animated mask from a list of candidate animated masks; and
  overlaying the target animated mask on the static image;
  wherein a hue of the static image is adjusted to be biased toward a hue of the target animated mask.

6. The computer-implemented method of claim 1, further comprising:
  selecting a target animated object from a list of candidate animated objects; and
  superimposing the target animated object on the static image.

7. The computer-implemented method of claim 1, wherein the one or more objects comprise an animal object;
  wherein the method further comprises:
    selecting a target sub-part object from a list of candidate sub-part objects;
    automatically detecting a target position and a target orientation of the target sub-part object in the animal object; and
    automatically replacing the target sub-part object with a target animated sub-part object at the target position and along the target orientation;
    wherein the target animated sub-part object has an animated movement.

8. The computer-implemented method of claim 7, wherein the animal object is a body image of a subject; and
  the target sub-part object of the animal object is selected from a group consisting of an eye object, a mouth object, a nose object, an ear object, a neck object, a hand object, an arm object, a finger object, a leg object, a toe object, a lip object, an eyebrow object, a hair object, a knee object, and any portion thereof.

9. The computer-implemented method of claim 1, further comprising rendering a special dynamic effect on the static image as a whole.

10. The computer-implemented method of claim 9, wherein the special dynamic effect is selected from a group consisting of a zooming-in effect, a zooming-out effect, an oscillation effect, a transition from a distal view to a close-up view, a flipping effect, and a TV snowflake effect.

11. The computer-implemented method of claim 1, further comprising:
  selecting a target cartoon object from a list of candidate cartoon objects;
  superimposing the target cartoon object on the static image to generate a synthetic object having the target cartoon object;
  using a camera to capture a video stream of a subject in real time; and
  generating a video of the synthetic object having movement synchronized with a movement of the subject simultaneously.

12. An apparatus for realizing a dynamic effect in a static image, comprising:
  a touch control display panel;
  a memory;
  one or more processors;
  wherein the memory and the one or more processors are connected with each other; and
  the memory stores computer-executable instructions for controlling the one or more processors to render a dynamic effect to one or more objects in the static image;
  wherein the one or more objects comprise a foreground object;
  wherein the memory stores computer-executable instructions for controlling the one or more processors to:
    set boundary points surrounding the foreground object to define a boundary area in which a dynamic movement is to be realized, wherein the boundary points are defined by touch positions on the touch control display panel in which the static image is displayed;
    set a movement line to define a dynamic movement direction along which the dynamic movement is to be realized, wherein the movement line is defined by a continuous touch over different positions on the touch control display panel;
    set a stationary area to define an area in which the dynamic movement is prohibited, wherein the stationary area is defined by a first touch area corresponding to the stationary area on the touch control display panel;

generate an animation of the foreground object in the boundary area moving along the dynamic movement direction; and remove the movement line upon detection of a touch on the touch control display panel at a position corresponding to the movement line;

wherein the memory further stores computer-executable instructions for controlling the one or more processors to form a boundary region by setting two immediately adjacent boundary points;

wherein a boundary of the boundary area comprises multiple boundary regions respectively formed by respective pairs of immediately adjacent boundary points;

the closer a position in the boundary region is to a respective boundary point, the less a movement of the animation of the foreground object is rendered; and the further away a position in the boundary region is from a center of the boundary area, the less a movement of the animation of the foreground object is rendered.

13. The apparatus of claim 12, wherein the memory further stores computer-executable instructions for controlling the one or more processors to:

remove at least a portion of the stationary area defined by a second touch area on the touch control display panel; and remove the boundary points upon detection of a touch on the touch control display panel at a position corresponding to the boundary points.

14. The apparatus of claim 12, wherein the one or more objects further comprise a background object;

wherein the memory further stores computer-executable instructions for controlling the one or more processors to:

segment the background object from the static image;

select a target scene for the background object from a list of candidate scenes;

replace the background object with a target animated background object based on the target scene; and adjust a hue of the static image to be biased toward a hue of the target scene.

15. The apparatus of claim 12, wherein the memory further stores computer-executable instructions for controlling the one or more processors to:

select a target animated mask from a list of candidate animated masks; and overlay the target animated mask on the static image;

wherein a hue of the static image is adjusted to be biased toward a hue of the target animated mask.

16. The apparatus of claim 12, wherein the memory further stores computer-executable instructions for controlling the one or more processors to:

select a target animated object from a list of candidate animated objects; and superimpose the target animated object on the static image.

17. The apparatus of claim 12, wherein the one or more objects comprise an animal object;

wherein the memory further stores computer-executable instructions for controlling the one or more processors to:

select a target sub-part object from a list of candidate sub-part objects;

automatically detect a target position and a target orientation of the target sub-part object in the animal object; and automatically replace the target sub-part object with a target animated sub-part object at the target position and along the target orientation;

wherein the target animated sub-part object has an animated movement.

18. The apparatus of claim 12, wherein the memory further stores computer-executable instructions for controlling the one or more processors to render a special dynamic effect on the static image as a whole.

19. The apparatus of claim 12, further comprising a camera configured to capture a video stream of a subject in real time;

wherein the memory further stores computer-executable instructions for controlling the one or more processors to:

select a target cartoon object from a list of candidate cartoon objects;

superimpose the target cartoon object on the static image to generate a synthetic object having the target cartoon object; and generate a video of the synthetic object having movement synchronized with a movement of the subject in the video stream.

20. A computer-program product comprising a non-transitory tangible computer-readable medium having computer-readable instructions thereon, the computer-readable instructions being executable by a processor to cause the processor to perform rendering a dynamic effect to one or more objects in a static image;

wherein the one or more objects comprise a foreground object;

wherein the computer-readable instructions being executable by a processor to cause the processor to perform:

setting boundary points surrounding the foreground object to define a boundary area in which a dynamic movement is to be realized, wherein the boundary points are set by touch positions on a touch control display panel in which the static image is displayed;

setting a movement line to define a dynamic movement direction along which the dynamic movement is to be realized, wherein the movement line is set by a continuous touch over different positions on the touch control display panel;

setting a stationary area to define an area in which the dynamic movement is prohibited, wherein the stationary area is set by a first touch area on the touch control display panel;

generating an animation of the foreground object in the boundary area moving along the dynamic movement direction; and removing the movement line;

wherein removing the movement line comprises detecting a touch on the touch control display panel at a position corresponding to the movement line;

wherein setting the boundary points surrounding the foreground object to define the boundary area in which a dynamic movement is to be realized comprises forming a boundary region by setting two immediately adjacent boundary points;

wherein a boundary of the boundary area comprises multiple boundary regions respectively formed by respective pairs of immediately adjacent boundary points;

the closer a position in the boundary region is to a respective boundary point, the less a movement of the animation of the foreground object is rendered; and the further away a position in the boundary region is from a center of the boundary area, the less a movement of the animation of the foreground object is rendered.

\* \* \* \* \*